US009040925B2

(12) United States Patent
Giarmana et al.

(10) Patent No.: US 9,040,925 B2
(45) Date of Patent: May 26, 2015

(54) SPATIALLY-AWARE RADIATION PROBE SYSTEM AND METHOD

(71) Applicant: Canberra Industries, Inc., Meriden, CT (US)

(72) Inventors: Olivier Gaëtan Giarmana, Blere (FR); Archibald Dupont, Loches (FR); Frederic Pierre Henri Meyer, Plaisir (FR); Damien du Bouëtiez de Kerorguen, Reignier Esery (FR)

(73) Assignee: CANBERRA INDUSTRIES, INC., Meriden, CT (US)

( * ) Notice: Subject to any disclaimer, the term of this patent is extended or adjusted under 35 U.S.C. 154(b) by 154 days.

(21) Appl. No.: 13/749,944

(22) Filed: Jan. 25, 2013

(65) Prior Publication Data
US 2014/0175291 A1 Jun. 26, 2014

Related U.S. Application Data

(60) Provisional application No. 61/740,919, filed on Dec. 21, 2012, provisional application No. 61/752,099, filed on Jan. 14, 2013, provisional application No. 61/754,062, filed on Jan. 18, 2013, provisional application No. 61/755,094, filed on Jan. 22, 2013.

(51) Int. Cl.
*G01T 1/17* (2006.01)
*G01T 1/161* (2006.01)
(Continued)

(52) U.S. Cl.
CPC . *G01T 1/17* (2013.01); *G01T 1/161* (2013.01); *G01T 1/169* (2013.01); *G01T 7/00* (2013.01); *G01T 1/20* (2013.01); *G01T 1/24* (2013.01)

(58) Field of Classification Search
CPC ............ G01T 1/169; G01T 1/17; G01T 1/167
USPC .......................................................... 434/218
See application file for complete search history.

(56) References Cited

U.S. PATENT DOCUMENTS 4,862,005 A 8/1989 Johnson et al.
6,362,472 B1 3/2002 Yarnall et al.
(Continued)

FOREIGN PATENT DOCUMENTS

WO    WO 9724631 A1    7/1997
WO    WO 0216965 A2    2/2002
(Continued)

*Primary Examiner* — Constantine Hannaher
(74) *Attorney, Agent, or Firm* — David W. Carstens; Kevin M. Klughart; Carstens & Cahoon, LLP

(57) ABSTRACT

A spatially-aware radiation probe system/method allowing for detection and correction of radiation readings based on the position and/or movement of a radiation detector is disclosed. The system incorporates a radiation detector combined with a spatially-aware sensor to permit detection of spatial context parameters associated with the radiation detector and/or object being probed. This spatial context information is then used by analysis software to modify the detected radiation values and/or instruct the radiation probe operator as to appropriate measurement activity to ensure accurate radiation measurements. The spatially-aware sensor may include but is not limited to: distance sensors to determine the distance between the radiation detector and the object being monitored; accelerometers integrated within the radiation detector to detect movement of the radiation detector; and/or axial orientation sensors to determine the axial orientation of the radiation detector.

60 Claims, 32 Drawing Sheets

(51) Int. Cl.
*G01T 1/169* (2006.01)
*G01T 7/00* (2006.01)
*G01T 1/20* (2006.01)
*G01T 1/24* (2006.01)

(56) References Cited

U.S. PATENT DOCUMENTS

2004/0232323 A1* 11/2004 Bosco et al. .................. 250/253
2006/0249684 A1* 11/2006 Ronaldson et al. ........... 250/395
2007/0273538 A1* 11/2007 Holder .......................... 340/600
2008/0144046 A1 6/2008 Young et al.
2010/0266171 A1 10/2010 Wendler et al.

FOREIGN PATENT DOCUMENTS

WO WO 2005012945 A1 2/2005
WO WO 2008142172 A2 11/2008

* cited by examiner

SPATIALLY-AWARE RADIATION PROBE SYSTEM AND METHOD

CROSS REFERENCE TO RELATED APPLICATIONS

This application claims benefit under 35 U.S.C. §119 and incorporates by reference U.S. Provisional Patent Application for SPATIALLY-AWARE RADIATION PROBE SYSTEM AND METHOD by inventors Olivier Gaëtan Giarmana and Archibald (nmn) Dupont, filed electronically with the USPTO on Dec. 21, 2012, with Ser. No. 61/740,919.

This application claims benefit under 35 U.S.C. §119 and incorporates by reference U.S. Provisional Patent Application for SPATIALLY-AWARE RADIATION PROBE SYSTEM AND METHOD by inventors Olivier Gaëtan Giarmana and Archibald (nmn) Dupont, filed electronically with the USPTO on Jan. 14, 2013, with Ser. No. 61/752,099.

This application claims benefit under 35 U.S.C. §119 and incorporates by reference U.S. Provisional Patent Application for SPATIALLY-AWARE RADIATION PROBE SYSTEM AND METHOD by inventors Olivier Gaëtan Giarmana and Archibald (nmn) Dupont, filed electronically with the USPTO on Jan. 18, 2013, with Ser. No. 61/754,062.

This application claims benefit under 35 U.S.C. §119 and incorporates by reference U.S. Provisional Patent Application for SPATIALLY-AWARE RADIATION PROBE SYSTEM AND METHOD by inventors Olivier Gaëtan Giarmana and Archibald (nmn) Dupont, filed electronically with the USPTO on Jan. 22, 2013, with Ser. No. 61/755,094.

STATEMENT REGARDING FEDERALLY SPONSORED RESEARCH OR DEVELOPMENT

Not Applicable

REFERENCE TO A MICROFICHE APPENDIX

Not Applicable

FIELD OF THE INVENTION

The present invention generally relates to systems and methods for the detection of radiation, more particularly, but not by way of limitation, to the use of these devices in situations where radiation detection is performed in a portable context. While not limitive of the invention teachings, the present invention may in some circumstances be advantageously applied to categories including U.S. Patent Classifications 250/370.07 and 250/390.03 which correspond to International Patent Classifications G01T 1/02 and G01T 1/02/G01T 3/00 respectively.

The present invention proposes a spatially-aware radiation probe incorporating a spatially-aware sensor in conjunction with a radiation detector operating under computer control to both supervise and automate operator-monitored radiation measurements of an object/subject. Within this context the present invention permits improved radiation measurements in a variety of contexts, including portable radiation monitoring applications.

PRIOR ART AND BACKGROUND OF THE INVENTION

Within the prior art a wide variety of radiation detectors and probes have been disclosed. However, within the context of many portable versions of these detectors/probes, the issue of the spatial context in which the radiation measurement takes place has always been a problem. For example, the following situations can have a detrimental impact on the accuracy and repeatability of radiation measurements in this context:

Distance between the radiation detector and the monitored object/subject may adversely impact the radiation measurement;

Movement of the radiation detector as it relates to the monitored object/subject may adversely impact the radiation measurement;

Axial orientation of the radiation detector as it relates to the monitored object/subject may adversely impact the radiation measurement;

Differences in how individual operators coordinate and process radiation measurements as they relate to the monitored object/subject may adversely impact the radiation measurement; and Combinations of these spatial context variables may combine to adversely impact the radiation measurement.

Within this context, there is an unmet need in the prior art to provide a system and methodology to compensate for and manage these spatial context parameters within a radiation measurement application. While the prior art does teach that in some circumstances these spatial contexts can be managed in terms of confining the monitored subject/object during the radiation measurement process, the prior art has not addressed compensating for and managing these spatial context variables as a whole or in contexts where the radiation measurement system must by necessity be portable in nature.

OBJECTIVES OF THE INVENTION

Accordingly, the objectives of the present invention are (among others) to circumvent the deficiencies in the prior art and affect the following objectives:

(1) Provide for a spatially-aware radiation probe system and method that permits radiation measurements to be taken in a portable handheld context.

(2) Provide for a spatially-aware radiation probe system and method that permits radiation measurements to be taken under computer supervision to ensure accurate and consistent radiation measurement results.

(3) Provide for a spatially-aware radiation probe system and method that permits radiation measurements to be taken by unskilled radiation measurement operators.

(4) Provide for a spatially-aware radiation probe system and method that allows incorporation of distance (proximity) measurement data to the measurement object in the radiation measurement result.

(5) Provide for a spatially-aware radiation probe system and method that allows incorporation of radiation detector movement in the radiation measurement result.

(6) Provide for a spatially-aware radiation probe system and method that allows incorporation of radiation detector axial position in the radiation measurement result.

(7) Provide for a spatially-aware radiation probe system and method that improves the quality of radiation measurements.

(8) Provide for a spatially-aware radiation probe system and method that allows radiation measurements to occur reliably with varying levels of background radiation.

(9) Provide for a spatially-aware radiation probe system and method that allows tailoring of operator instruction based on the radiation measurement application context.

(10) Provide for a spatially-aware radiation probe system and method that allows tailoring of operator instruction based on the skill/sophistication level of the operator.
(11) Provide for a spatially-aware radiation probe system and method that allows dynamic generation of operator instructions based on a radiation measurement state.
(12) Provide for a spatially-aware radiation probe system and method that allows dynamic generation of operator instructions based on historical radiation measurement data.
(13) Provide for a spatially-aware radiation probe system and method that allows quantification of the quality of a radiation measurement.
(14) Provide for a spatially-aware radiation probe system and method that allows quantification of the compliance of an operator to standardized radiation measurement practices.
(15) Provide for a spatially-aware radiation probe system and method that permits dynamic subtraction of background radiation from a radiation measurement to improve measurement quality and reliability.

While these objectives should not be understood to limit the teachings of the present invention, in general these objectives are achieved in part or in whole by the disclosed invention that is discussed in the following sections. One skilled in the art will no doubt be able to select aspects of the present invention as disclosed to affect any combination of the objectives described above.

BRIEF SUMMARY OF THE INVENTION

System Overview

The present invention in various embodiments addresses one or more of the above objectives in the following manner. The system incorporates a spatially-aware sensor to acquire spatial context information associated with the radiation detector and/or monitored object/subject. This spatial context information is then used by a computer to modify the detected radiation values associated with the radiation detector and/or instruct the operator taking these readings to spatially position the radiation detector properly in order to achieve reliable and repeatable radiation measurements.

Within this context, the use of distance measurement devices (to determine the distance between the radiation detector and the monitored object/subject), accelerometers (to detect movement of the radiation detector during the measurement process), and/or axial orientation sensors (to detect the absolute orientation of the radiation detector) are specifically anticipated as possible (but not inclusive) spatially-aware sensors. The combination of spatial awareness in conjunction with coordination of operator actions ensures that the overall radiation measurement process is uniform, accurate, and adaptive to variations in the spatial context of the radiation detector and object/subject being monitored. This flexibility makes the overall system uniquely suited to application in portable radiation monitoring devices.

Method Overview

The present invention system may be utilized in the context of an overall spatially-aware radiation probe method wherein the spatially-aware radiation probe system described previously is provided with a user interface that instructs an operator as to the proper spatial positioning of the radiation probe and its operation in order to ensure accurate and repeatable radiation measurement results. Thus, the system as described may incorporate computerized coordination of operator activity to minimize errors that may occur during the radiation measurement operation. This combination of computerized control that incorporates a spatially-aware context of both the radiation detector and the monitored object/subject ensures that even unskilled operators may be used to gather and record accurate radiation measurement results, even in a portable application context.

BRIEF DESCRIPTION OF THE DRAWINGS

For a fuller understanding of the advantages provided by the invention, reference should be made to the following detailed description together with the accompanying drawings wherein.

DESCRIPTION OF THE PRESENTLY PREFERRED EXEMPLARY EMBODIMENTS

Figure 1:
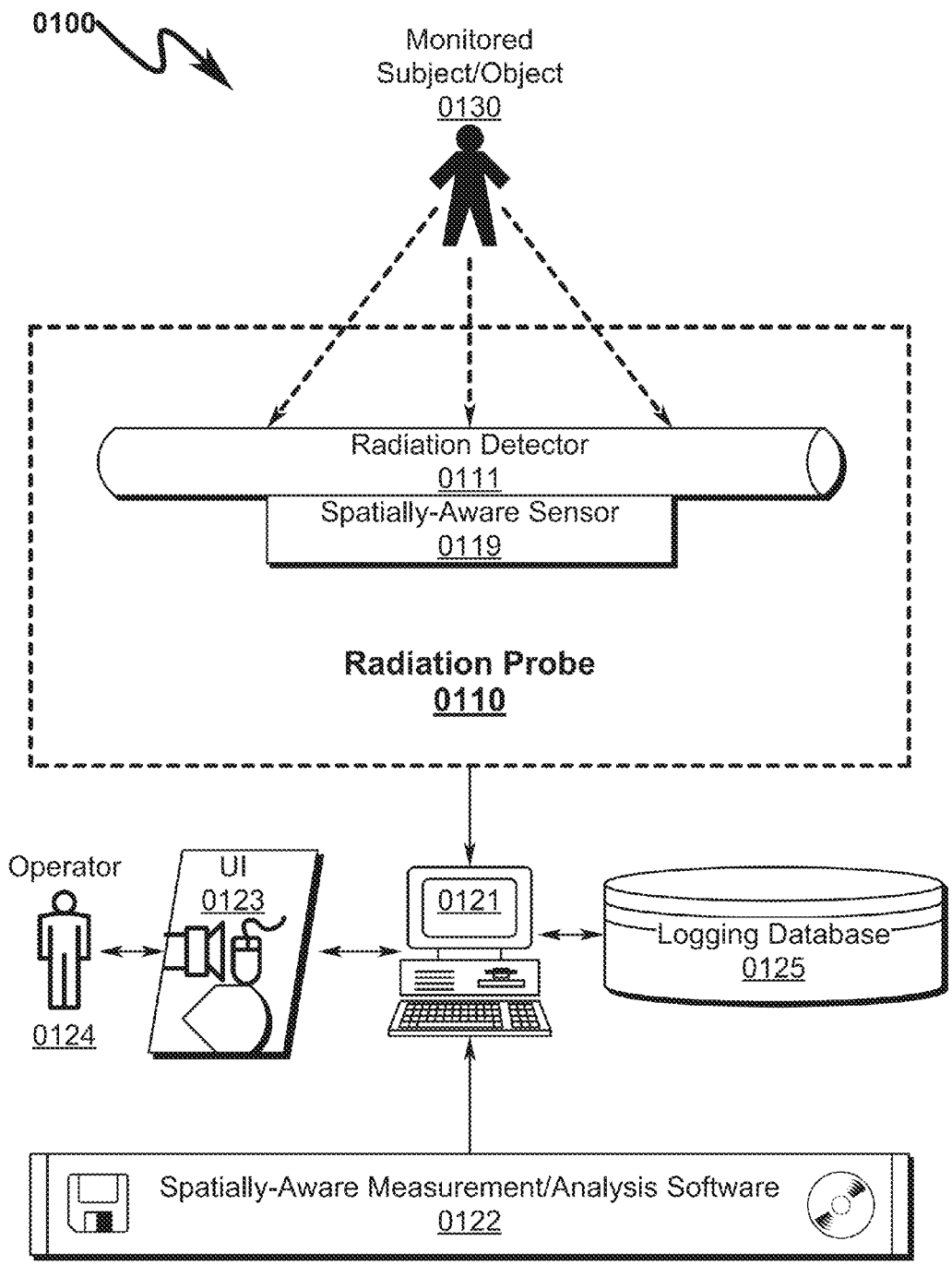
FIG. 1 illustrates a system diagram describing a presently preferred system context for the present invention.

While this invention is susceptible of embodiment in many different forms, there is shown in the drawings and will herein be described in detailed preferred embodiment of the invention with the understanding that the present disclosure is to be considered as an exemplification of the principles of the invention and is not intended to limit the broad aspect of the invention to the embodiment illustrated.

The numerous innovative teachings of the present application will be described with particular reference to the presently preferred embodiment, wherein these innovative teachings are advantageously applied to the particular problems of a SPATIALLY-AWARE RADIATION PROBE SYSTEM AND METHOD. However, it should be understood that this embodiment is only one example of the many advantageous uses of the innovative teachings herein. In general, statements made in the specification of the present application do not necessarily limit any of the various claimed inventions. Moreover, some statements may apply to some inventive features but not to others.

Method Steps not Limitive

The general method steps described herein may be modified heavily depending on a number of factors, with rearrangement and/or addition/deletion of steps anticipated by the scope of the present invention. Integration of the described methods and other preferred exemplary embodiment methods in conjunction with a variety of preferred exemplary embodiment systems described herein is anticipated by the overall scope of the present invention.

Radiation Detector not Limitive

The present invention may be utilized as a spatially-aware radiation probe in a wide variety of contexts which may include radiation monitoring and/or scanning applications. Thus, the term "detector" or "detection" should be given its broadest possible meaning to include, among other things, radiation monitoring and/or radiation scanning.

Radiation Detector Type/Number not Limitive

While the present invention may be applied using a wide variety of radiation detectors (RD) that are responsive to radiation detection, the following exemplary list of RDs are specifically anticipated to be applicable to configurations taught by the present invention:
Plastic scintillators;
Organic scintillators;
Inorganic scintillators (CsI, NaI, LaBr, BGO, etc.);
Gas detectors (Geiger-Müller counters, ionization chamber, proportional counters, etc. . . . ); and
Semiconductors (CdTe, CZT, Ge, etc. . . . ).
One skilled in the art will recognize that this list is not exhaustive and that other RDs may be utilized within the teachings of the present invention. Additionally, various embodiments of the present invention may utilize multiple radiation detectors (not necessarily of the same type) within a given application context or invention embodiment.

Electrical Coupling not Limitive

The present invention may utilize the term "electrically coupled" or its equivalent in describing communication between a radiation detector (RD) and a computing device (CD) and/or the communication between the spatially-aware sensor (SAS) and a computing device (CD). This electrical coupling should be construed broadly to include both physical electrical coupling as well as communication via any form of wireless communication such as BLUETOOTH®, WiFi, or other wireless communication means.

Computing Device not Limitive

The present invention may utilize the term "computer system", "computing device (CD)" or its equivalent in describing various control systems used within the present invention. These synonymous terms should be given their widest possible interpretation in this context, and are specifically anticipated to include mobile/portable computing devices such as handheld computers, tablet computers, smartphones, cell phones, laptop computer, and the like. Within the scope of the present invention, the radiation probe as described herein may be integrated with the computing device (CD) in a unitary enclosure in some preferred embodiments. The use of feedback/logging with the computing device (CD) including but not limited to text data, audio, voice, photographs, video imaging, etc. is anticipated with the present invention, and may in many preferred embodiments be integrated with a networked supervisory control computer system that supervises and monitors a spatially diverse network of interconnected radiation detectors controlled by a plethora of computing devices (CDs).

Radiation Detector Number not Limitive

The present invention may make use of multiple radiation detectors in a variety of configurations in many preferred embodiments. In some of these preferred embodiments the radiation detectors may constitute background radiation detectors/sensors (BRD) (responsible for quantifying background radiation levels) as well as measurement radiation detectors/sensors (MRD) (responsible for determining the actual radiation levels for the monitored subject/object). This combination of radiation detectors in some preferred embodiments may permit dynamic subtraction of background radiation depending on the spatial context of the radiation detector, resulting in improved radiation measurement results and reliability. Thus, the present invention makes no limitation on the number of radiation detectors in this context, whether the detectors operate in different contexts, or whether the detectors may serve several different functions in a time-multiplexed fashion.

System Overview (0100)

The present invention may be seen in an overview context as generally illustrated in FIG. 1 (0100), wherein the spatially-aware radiation probe (0110) may operate in conjunction with a computer system (0121) running under control of software read from a computer readable medium (0122) that generates a user interface (UI) (0123). This computer system (0121) may interact with an operator (0124) who typically interfaces with the computer system (0121) and/or software application/operating system (0122) using a user interface (0123) that may include a graphical user interface and/or an audible (speech-driven) user interface.

Radiation data retrieved from the spatially-aware radiation probe (0110) and interpreted by the computer system (0121) is typically logged in one or more databases (0125). Not shown here are typical analog interface circuitry between the spatially-aware radiation probe (0110) and computer system (0121) that may condition and discriminate data obtained from the radiation detector (0111) contained within the spatially-aware radiation probe (0110). These interface circuits are well known to those skilled in the art and depend heavily on the exact application context and radiation detector (0111) type utilized within the spatially-aware radiation probe (0110).

The radiation detector (0111) is mated with one or more spatially-aware sensors (SAS) (0119) that relate the spatial context of the radiation detector (0111) and/or the monitored subject/object (0130) to the computing device (0121). This information is then used to modify and/or coordinate the radiation measurements of the monitored subject (0130) by the radiation detector (0111).

As stated previously, the communication between the computing device (CD) (0121) and the radiation detector (0111) and/or spatially-aware sensor (SAS) (0119) may be accomplished using direct electrical connections or via wireless communication as in the case of a portable radiation probe (0110).

Exemplary Spatially-Aware Sensors (0200)

Figure 2:
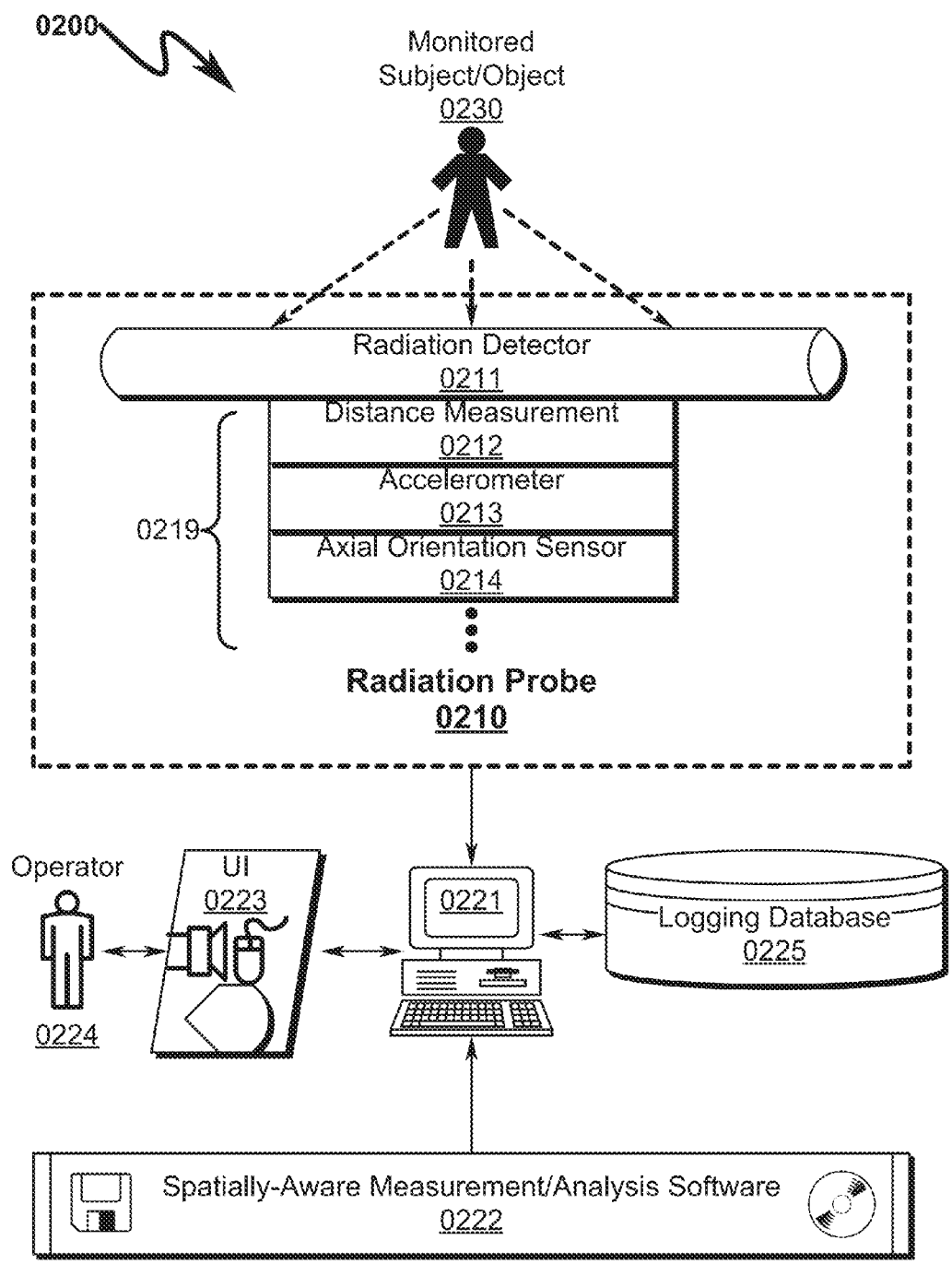
FIG. 2 illustrates a detailed system diagram describing a presently preferred system context for the present invention.

The present invention incorporate a wide variety of spatially aware sensors (0219) as generally depicted in FIG. 2 (0200), including but not limited to the following:

- Distance measurement sensors (0212) that detect the distance between the radiation detector (0211) and the monitored subject/object (0230);
- Accelerometers (0213) that detect movement of the radiation detector (0211); and
- Axial orientation sensors (0214) that detect the absolute axial alignment of the radiation detector (0211).

One skilled in the art will recognize that this list of spatially-aware sensors is not exhaustive and may be augmented by other spatially-aware sensors not included in this specific list.

Automated Operator Coordination (0300)

Figure 3:
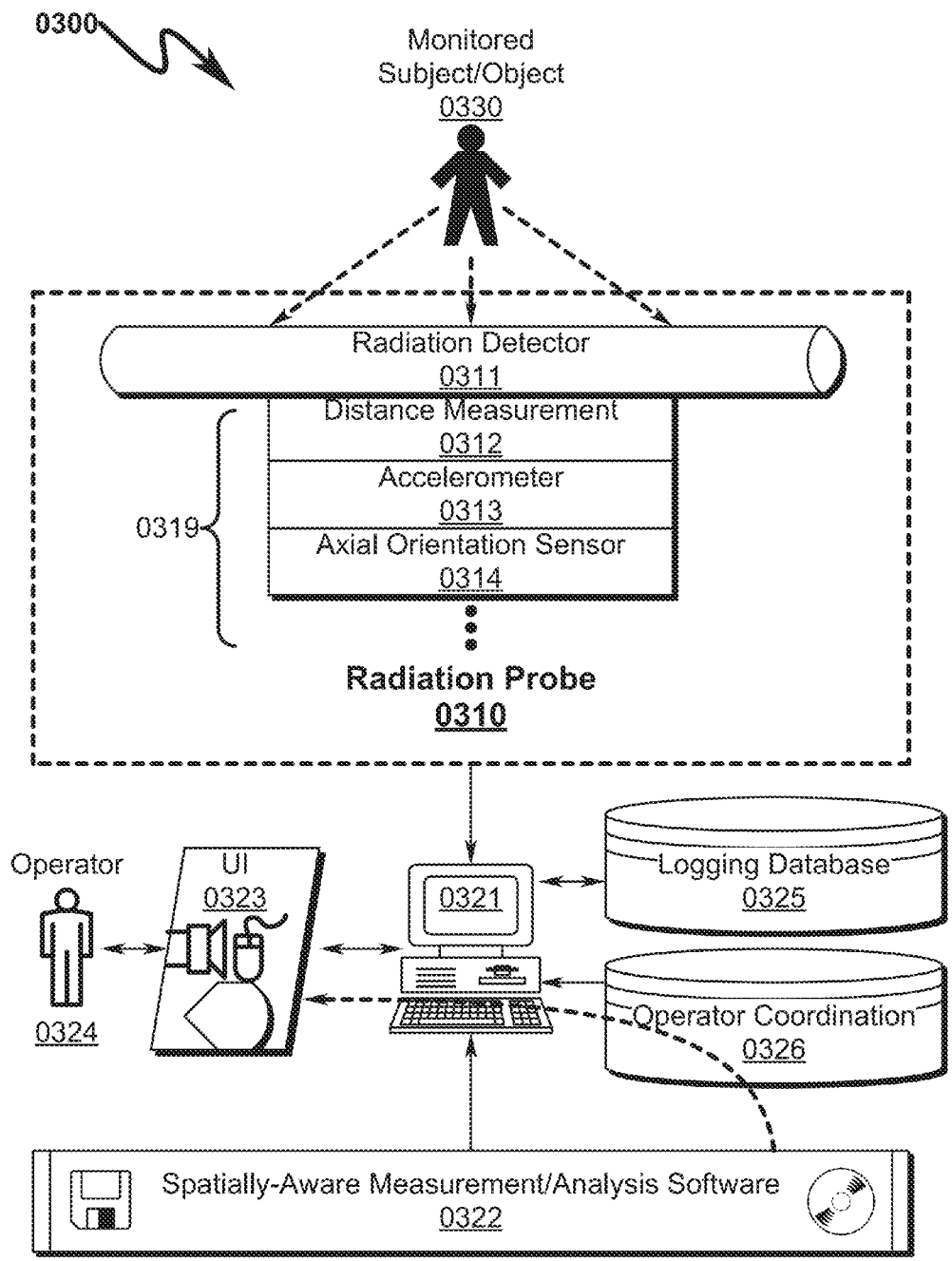
FIG. 3 illustrates a detailed system diagram describing a presently preferred system context for the present invention incorporating an operator coordination information database.

The present invention as generally depicted in FIG. 3 (0300) may also incorporate an automated operator coordination information database (0326) that is used by the spatially-aware measurement/analysis software (0322) to direct the operator (0324) to spatially manipulate the radiation detector (0311) in response to information retrieved from the spatially-aware sensors (0319).

Within this context, the present invention anticipates that a wide variety of user interfaces (UI) (0323) may be used in this context to direct the actions of the operator (0324). Typically, information taken from the spatially-aware sensors (0319) as applied to the measured radiation parameter values from the radiation detector (0311) will be used to index into the coordination database (0326) to retrieve instructions for the operator to spatially manipulate the radiation detector (0311) to affect an accurate and repeatable radiation measurement of the monitored subject/object (0330). The user interface (0323) in this context is specifically anticipated to include graphical user interfaces (GUIs) and/or audible/speech/voice interfaces and may be embodied on a wide variety of hardware devices that include but are not limited to portable/mobile electronic devices.

Within this context, the radiation probe (0310) may be configured to integrate radiation detectors (0311) and spatially-aware sensors (0319) to evaluate the movement of the monitored subject/object (0330) while taking radiation measurements. The software intelligence (0322) inside the radiation probe (0310) allows making an adjustment of the measurement algorithms depending on if the monitored subject/object (0330) moves fast, slow, or is stationary. This permits measurement of low contamination levels in an active nuclear environment with a portable radiation measurement probe as well as dose rate measurements in an active nuclear environment with a portable radiation measurement probe.

Using this spatially-aware sensor configuration for detecting subject/object/detector movement provides information that may be used to modify the final radiation measurement reading. This information could be used for different purposes, including but not limited to:

- detecting a shock and thus stopping measurement of high tension to avoid microphonic measurement effects;
- adapting smoothing algorithms to increase statistics in case of a static radiation measurement;
- adapt statistics and algorithm dynamics to follow best counting evolutions.

The radiation probe (0310) may include a variety of motion sensors in the anticipated embodiments, including but not limited to accelerometers and/or axial position sensors.

The radiation probe (0310) may also incorporate a distance sensor (0312) capable of determining the distance between the radiation detector (0311) and the monitored subject/object (0330). Using this sensor in this context permits the following:

Avoiding false alarm when the radiation detector (0311) is not in use.

Forcing a known distance between the monitored subject/object (0330) and the radiation detector (0311) by requiring the operator (0324) to check to control this measurement distance and to achieve the best possible measurement efficiency.

Providing control/diagnostic information to the operator such as "you are too far for a correct measurement."

Permitting operator feedback on a visual display and/or via audible speech commands with associated measurement alarms.

One skilled in the art will recognize that the above operator interaction/control scenarios are only exemplary of those possible with the teachings of the present invention.

Preferred Exemplary Method Embodiment (0400)

Figure 4:
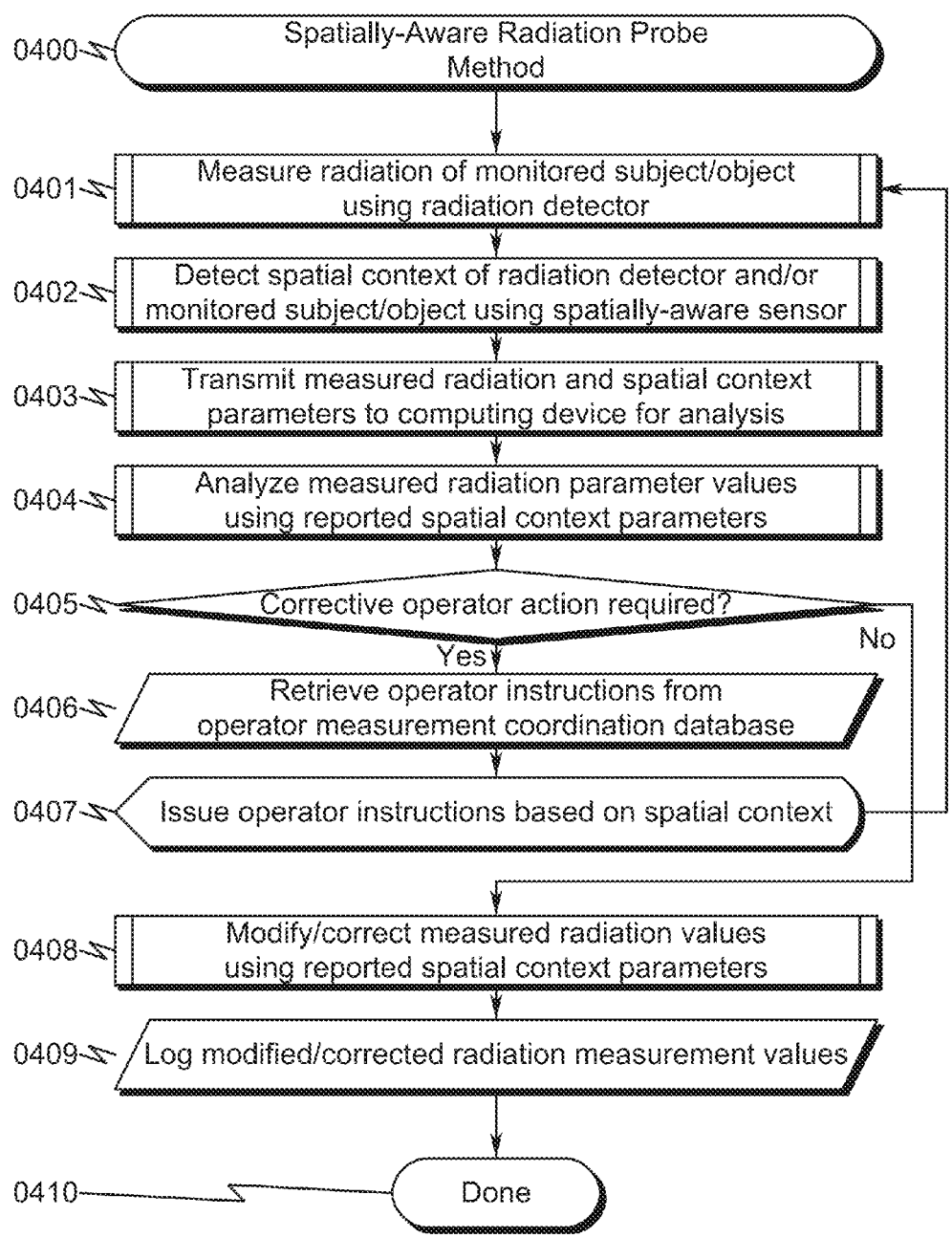
FIG. 4 illustrates a flowchart describing a presently preferred method embodiment of the present invention.

As generally seen in the flowchart of FIG. 4 (0400), the present invention spatially-aware radiation probe method may be generally described in terms of the following steps:

(1) Measuring radiation of a monitored subject/object using a radiation detector (0401);

(2) Detecting the spatial context of the radiation detector and/or monitored subject/object using a spatially-aware sensor (0402);

(3) Transmitting measured radiation and spatial context parameters to a computing device for analysis (0403);

(4) Analyzing the measured radiation parameter values using the spatial context parameters (0404);

(5) Based on this analysis, determining if corrective operator action is required, and if not, proceeding to step (8) (0405);

(6) Retrieving operator instructions from an operator measurement coordination database (0406);

(7) Issuing operator instructions for radiation detector spatial manipulation based on the measured spatial context parameters and proceeding to step (1) (0407);

(8) Modifying/correcting the measured radiation values using the reported spatial context parameters (0408); and (9) Logging the modified/corrected radiation measurement values to a computer database (0409).

Note that this method may incorporate displays, audible alarms, or other type of human and/or computer interfaces in conjunction with data logging and/or mathematical analysis of the collected radiation detector information. This general method summary may be augmented by the various elements described herein to produce a wide variety of invention embodiments consistent with this overall design description.

Minimum Detectable Activity (MDA) Algorithm

The present invention in many preferred exemplary embodiments attempts to integrate the contribution of the background radiation with that of the actual radiation measurement to achieve a metric of overall measurement reliability. Within this context, a minimum detectable activity (MDA) algorithm may be utilized to set a threshold of measurement activity which must be exceeded before the measurement is considered valid. A typical MDA algorithm that may be used in this context is as follows:

$$MDA \propto (K_{(1-\alpha)} + K_{(1-\beta)})\sqrt{BKG \times \left(\frac{1}{T_0} + \frac{1}{Tm}\right)} \quad (1)$$

where $MDA \equiv$ minimum detectable activity (counts)

$K_{(1-\alpha)} \equiv$ probability of false alarm $K_{(1-\beta)} \equiv$ probability of non-detection of a real source $BKG \equiv$ background counting rate (counts/sec)

$T_0 \equiv$ background integration time (sec)

$T_m \equiv$ measurement integration time (sec)

One skilled in the art will recognize that other MDA thresholds may be utilized in this context to validate the measurement value in the context of overall background radiation levels.

It is significant to note that the MDA as calculated above depends on the integration times associated with the background detector and the measurement detector as well as the counting rate of the background counter. These parameters all change depending on which mode/state the radiation probe operates. These modes/states depend on inputs from the spatially-aware sensor (SAS) inputs which define whether the radiation detector is idle (STANDBY), in frisking mode (DYNAMIC), or counting (STATIC). While these three states are only exemplary of many that are possible with the present invention, they will be used in various examples herein to describe one possible invention embodiment.

Static/Dynamic Measurement State Machine (0500)

Figure 5:
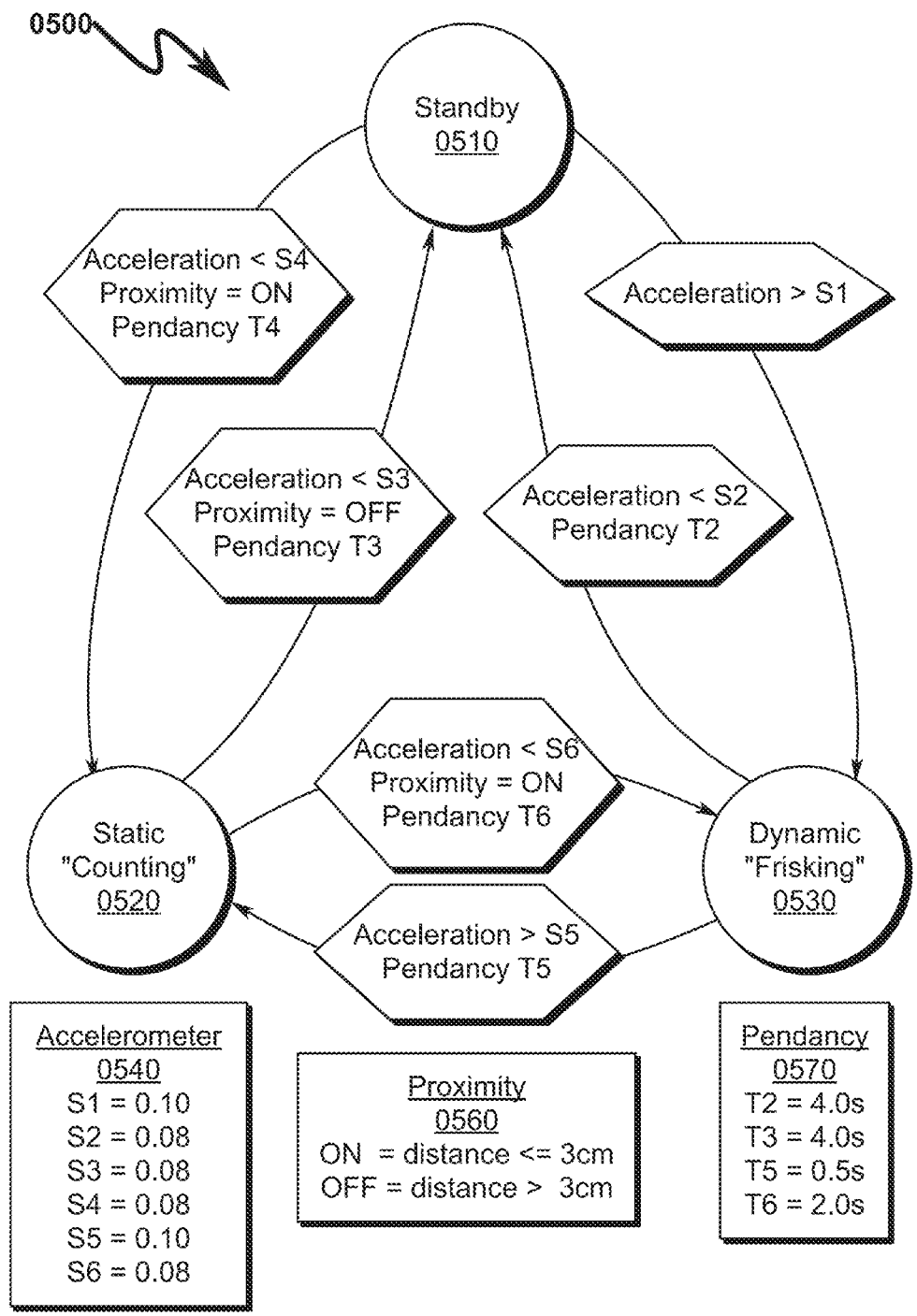
FIG. 5 illustrates a state machine diagram describing an overview of a presently preferred method embodiment of the present invention implementing a tri-mode handheld spatially-aware radiation probe method.

The present invention may be configured in some preferred embodiments to incorporate static as well as dynamic radiation measurements. Within this context, the state diagram generally depicted in FIG. 5 (0500) may be used to associate three or more measurement states with the invention. As illustrated in FIG. 5 (0500), these states may in some preferred embodiments incorporate a STANDBY (0510) or idle state in which the radiation probe is not enabled for radiation measurement, a STATIC state (0520) in which the radiation probe is proximal to a measurement subject/object and considered stationary for the purposes of a radiation measurement, and a DYNAMIC state (0530) in which the radiation probe is proximal to a measurement subject/object and considered in motion for purposes of radiation measurements.

These state differentials (0510, 0520, 0530) serve to eliminate false positive radiation alarm triggers by only activating the radiation alarms in situations where the probe measurement data is reliable. For example, rapid movement of the radiation probe in the DYNAMIC (0530) state permits "frisking" of the measurement subject/object may require a different interpretation of the radiation probe data than that in the STATIC (0520) state where the radiation probe is both proximal to and relatively stationary with respect to the measurement subject/object.

The state diagram in FIG. 5 (0500) provides parameters for acceleration (0540), proximity (0550) to the measurement subject/object, and pendency time (0560) within a given state or condition. The tables provided in this diagram are only exemplary of a wide variety of combinations that are possible and one skilled in the art will recognize that specific values for these parameters may be application specific. A more detailed discussion of the states and their content follows below.

STANDBY State (0510)

Within the STANDBY state (0510) the following conditions are asserted:

DISPLAY—indicates STANDBY.

ALARM—alarm functionality is disabled to prevent false alarms due to background fluctuations, absences of radiation sources, etc.

LED—the MDA is calculated and a status indicator LED blinks 1 s each 10 s with a color depending on the MDA (GREEN=acceptable MDA; RED=high background).

STATIC (COUNTING) State (0520)

Within the STATIC (COUNTING) State (0520) the following conditions are asserted:

DISPLAY—indicates net value measured.

ALARM—alarm functionality is enabled. If the LED is GREEN, the alarm is valid. If the LED is RED, the alarm could be a real source detected or a false alarm due to high background radiation.

LED—the MDA is calculated and the LED blinks slowly with a color depending on the MDA (GREEN=MDA is achievable, no alarm=no source, alarm=source detected; RED=MDA not achievable, no alarm=no certainty of no source, alarm=no certainty of source detection).

DYNAMIC (FRISKING) State (0530)

Within the DYNAMIC (FRISKING) State (0530) the following conditions are asserted:

DISPLAY—indicates net value measured.

ALARM—alarm functionality is enabled. If the LED is GREEN, the alarm is valid. If the LED is RED, the alarm could be a real source detected or a false alarm due to high background radiation.

LED—the MDA is calculated and the LED blinks quickly with a color depending on the MDA (GREEN=MDA is achievable, no alarm=no source, alarm=source detected; RED=MDA not achievable, no alarm=no certainty of no source, alarm=no certainty of source detection).

The smoothing time associated with the MDA calculation is shorter.

Multi-Mode Handheld Spatially-Aware Probe Method (0600)

Figure 6:
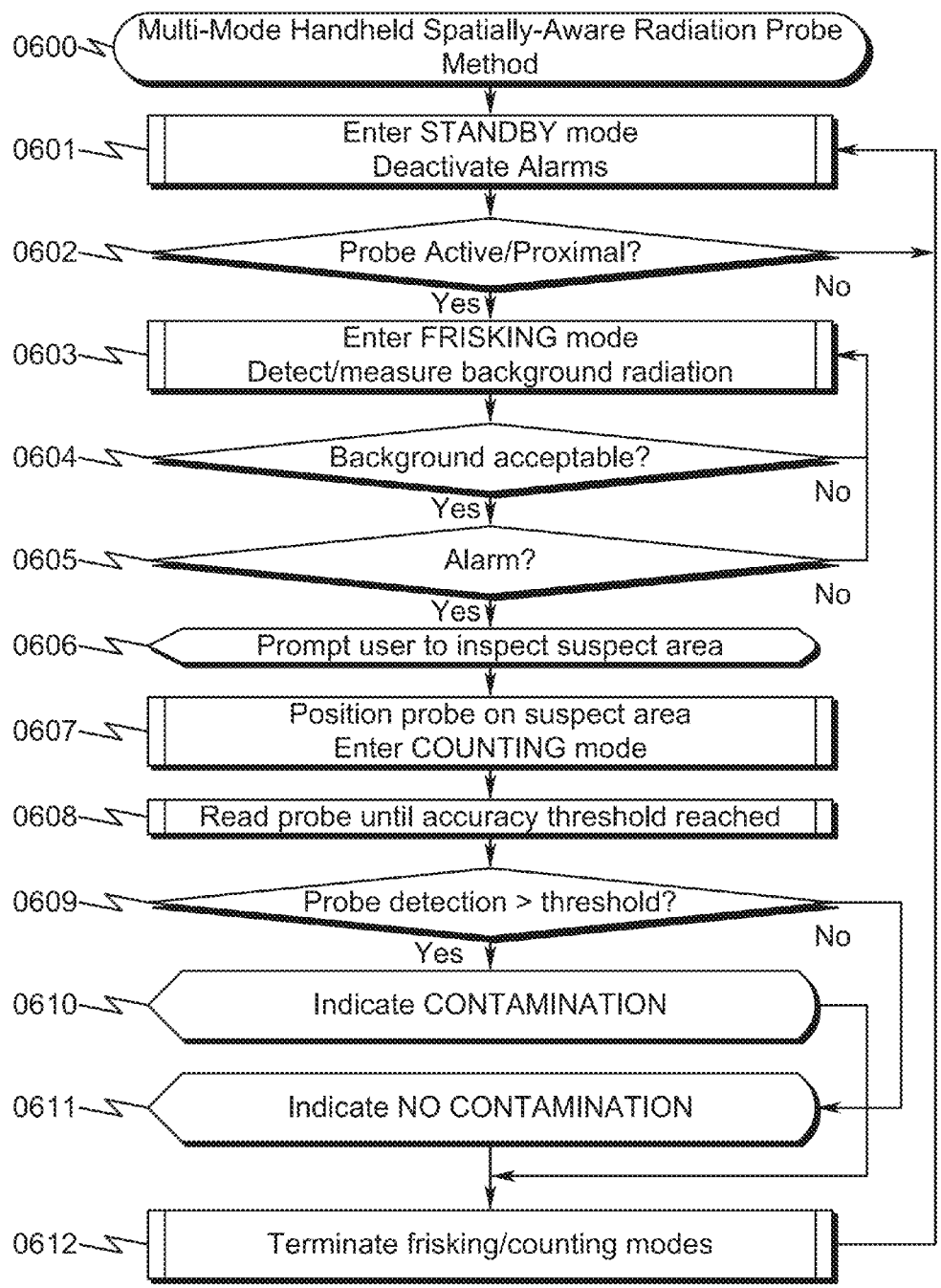
FIG. 6 illustrates a flowchart describing an overview of a presently preferred method embodiment of the present invention implementing a multi-mode handheld spatially-aware radiation probe method.

The present invention may in some preferred embodiments may utilize the state machine illustrated in FIG. 5 (0500) to implement a multi-mode handheld spatially-aware radiation probe system implementing a corresponding method that is mapped to the state machine functionality depicted in FIG. 5 (0500). This present invention preferred exemplary method embodiment anticipates a wide variety of variations in the basic theme of implementation, but as generally illustrated in FIG. 6 (0600) can be generalized as a multi-mode spatially-aware radiation probe method comprising:

(1) Entering a STANDBY mode in a computing device (CD) in which all radiation alarms are deactivated (0601);
(2) Determining with the CD if a spatially-aware sensor (SAS) is active/proximal to a monitored subject/object, and if not, proceeding to step (1) (0602);
(3) Entering a FRISKING (dynamic) mode in the CD to detect background radiation using a radiation detector (RD) (0603);
(4) Determining with the CD if the background radiation is at an acceptable level, and if not, proceeding to step (3) (0604);
(5) Determining with the CD if an alarm has been triggered, and if not, proceeding to step (3) (0605);
(6) Issuing operator coordination instructions by the CD for spatial manipulation of the RD prompting a user to inspect a suspect area on the monitored subject/object using the RD by positioning the RD proximal to the suspect area (0606);
(7) Entering a COUNTING mode in the CD (0607);
(8) Measuring radiation using the CD from the suspect area of the monitored subject/object using the RD to generate measured radiation value until an accuracy threshold is reached (0608);
(9) Determining if the measured radiation value is greater than a threshold for contamination, and if not, proceeding to step (11) (0609);
(10) Presenting a CONTAMINATION message with the CD to the user and proceeding to step (12) (0610);
(11) Presenting a NO CONTAMINATION message with the CD to the user (0611); and
(12) Terminating the FRISKING/COUNTING modes in the CD and proceeding to step (1) (0612).

Note that this method may incorporate displays, audible alarms, or other type of human and/or computer interfaces in conjunction with data logging and/or mathematical analysis of the collected radiation detection information. This general method summary may be augmented by the various elements described herein to produce a wide variety of invention embodiments consistent with this overall design description.

Handheld Spatially-Aware Radiation Probe Method (0700)-(0800)

Figure 7:
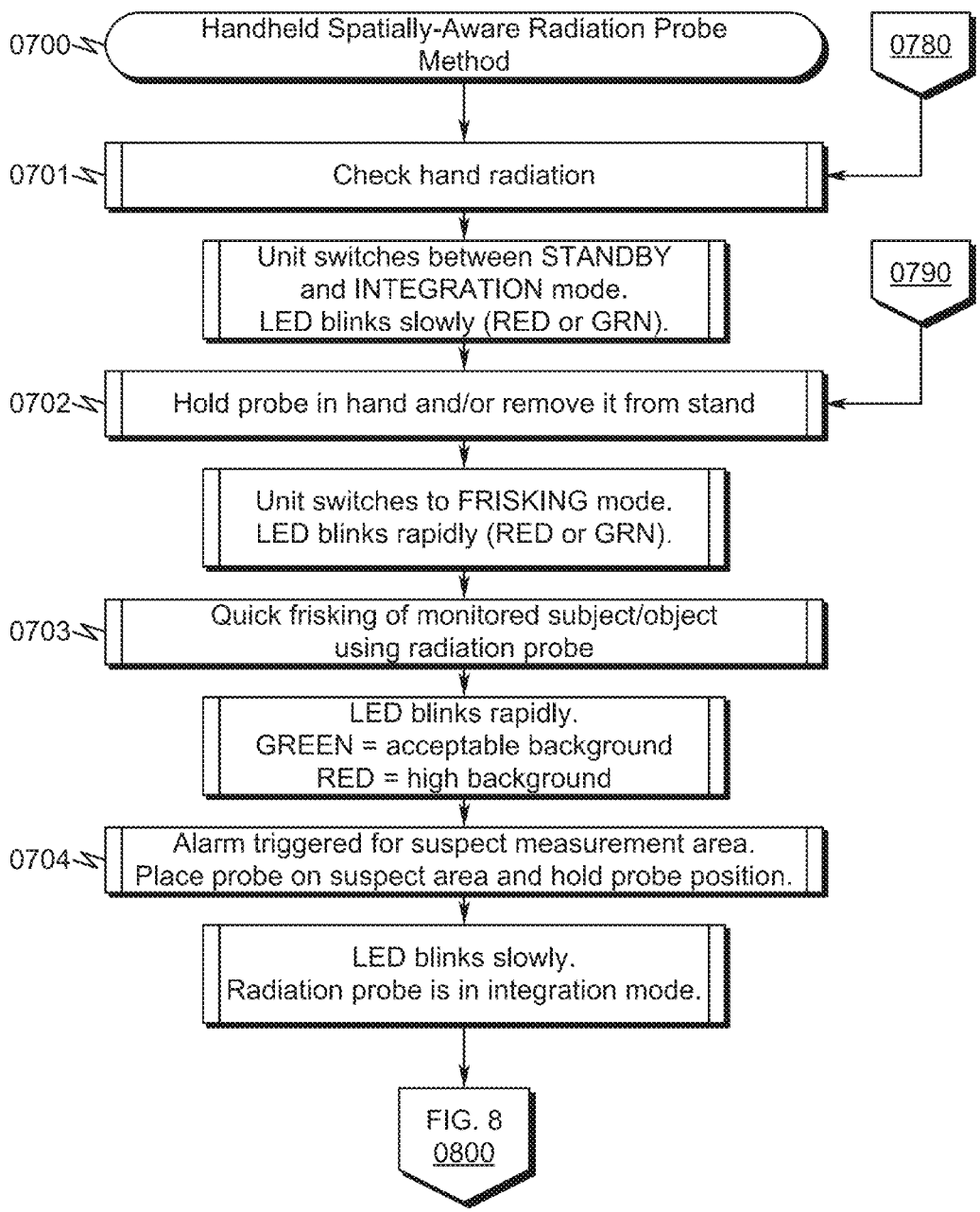
FIG. 7 illustrates a flowchart describing detail of a presently preferred method embodiment of the present invention implementing a multi-mode handheld spatially-aware radiation probe method.
Figure 8:
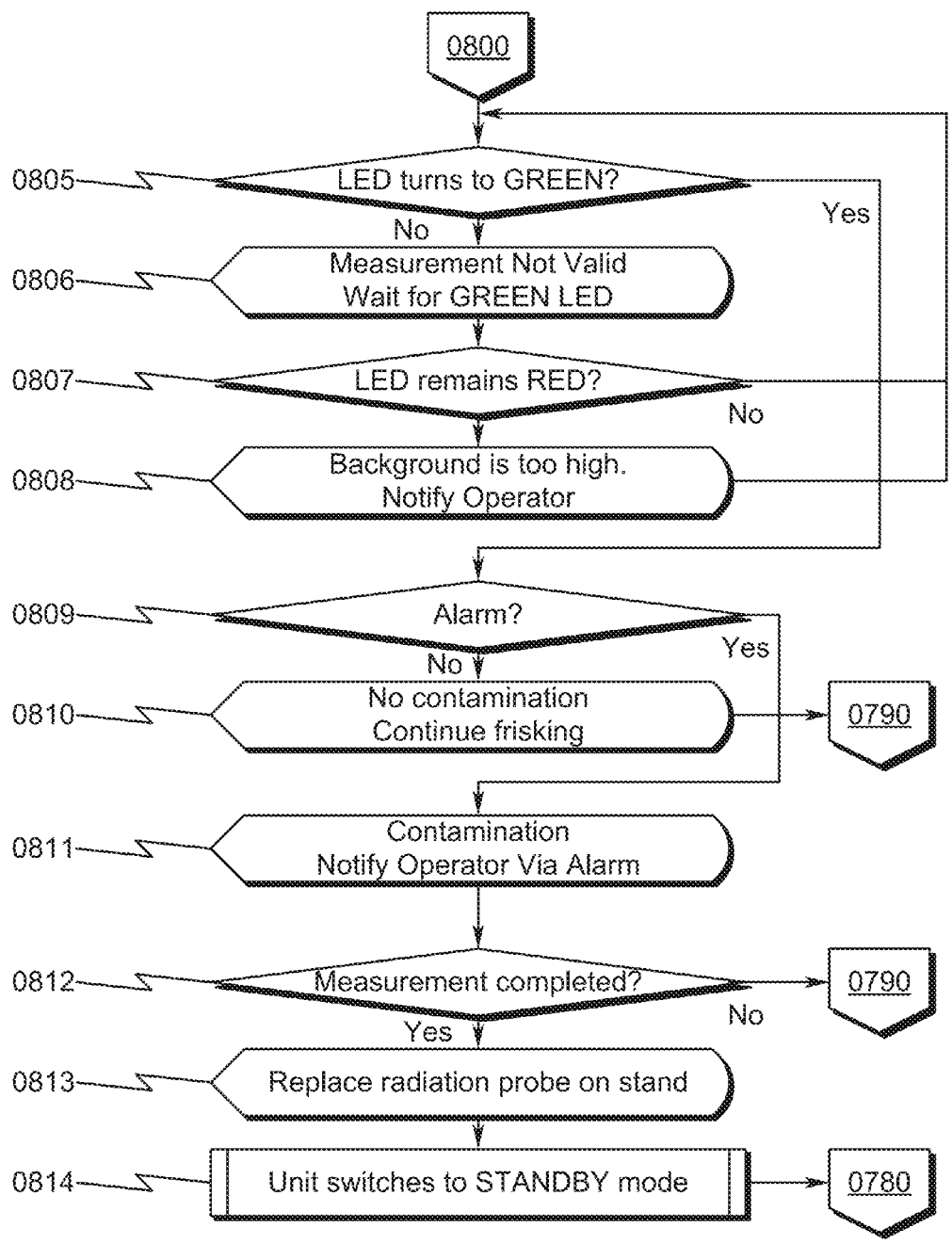
FIG. 8 illustrates a flowchart describing detail of a presently preferred method embodiment of the present invention implementing a multi-mode handheld spatially-aware radiation probe method.

The present invention may in some preferred embodiments implement the generalized method illustrated in FIG. 6 (0600) in the context of a handheld radiation probe implementing further functionality as depicted in the flowchart of FIG. 7 (0700) and FIG. 8 (0800). This present invention preferred exemplary method embodiment anticipates a wide variety of variations in the basic theme of implementation, but as generally illustrated in FIG. 7 (0700) and FIG. 8 (0800) can be generalized as a handheld spatially-aware radiation probe method comprising:

(1) Prompting a user with a computing device (CD) to check the user's hand radiation, wherein the CD switches between STANDBY and INTEGRATION mode and causes a LED to slowly blink at the user (0701);
(2) Prompting a user with the CD to grasp a spatially-aware sensor (SAS) containing a radiation detector (RD) and remove it from its retaining stand, wherein the CD switches to FRISKING mode and the CD causes an indicator LED to blink rapidly as RED (high background radiation) or GREEN (acceptable background radiation) (0702);
(3) Prompting the user with the CD to execute a quick frisking of the monitored subject/object using the RD, wherein the CD causes an indicator LED to blink rapidly as RED (high background radiation) or GREEN (acceptable background radiation) (0703);
(4) Prompting the user with the CD when an alarm triggers a suspect area for further measurement to direct the user to place the RD on the suspect area and hold the RD for further measurements, wherein the CD causes an indicator LED to blink slowly while the RD is in integration mode (0704);
(5) Determining with the CD if the indicator LED is GREEN, indicating a valid alarm, and if so, proceeding to step (9) (0805);

(6) Issuing operator coordination instructions by the CD that the measurement is not valid and that the user should wait for the GREEN LED indicator (0806);

(7) Determining with the CD if the indicator LED remains RED (indicating high background radiation), and if not, proceeding to step (5) (0807);

(8) Notifying the user with the CD that the background radiation is too high to take reliable measurements and proceeding to step (5) (0808);

(9) Determining with the CD if an alarm has been triggered, and if so, proceeding to step (11) (0809);

(10) Notifying the user with the CD that no contamination has been detected and that frisking should continue (or alternatively inhibiting user alarms) and proceeding to step (2) (0810);

(11) Notifying the user with the CD that CONTAMINATION has been detected via an alarm message (0811);

(12) Determining with the CD if the measurement cycle has been completed and if not, proceeding to step (2) (0812);

(13) Prompting the user with the CD to replace the RD on the retaining stand (0813); and

(14) Switching the CD status back to STANDBY mode and proceeding to step (1) (0814).

Note that this method may incorporate displays, audible alarms, or other type of human and/or computer interfaces in conjunction with data logging and/or mathematical analysis of the collected radiation detection information. This general method summary may be augmented by the various elements described herein to produce a wide variety of invention embodiments consistent with this overall design description.

Background Radiation Deduction (0900)

Figure 9:
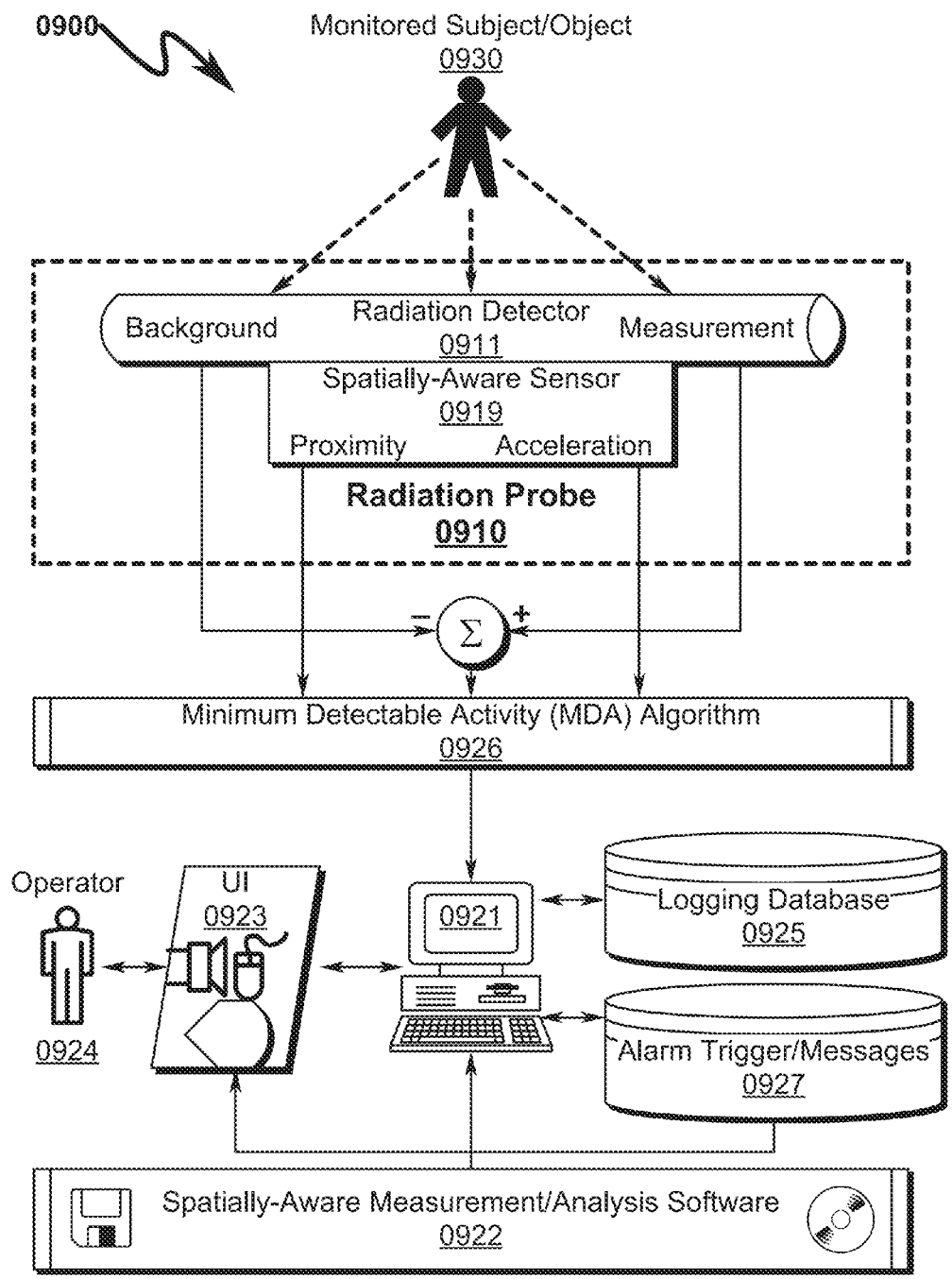
FIG. 9 illustrates a system diagram describing a presently preferred system context for the present invention illustrating a preferred exemplary system incorporating radiation deduction.

The present invention may be configured in some preferred embodiments as generally depicted in FIG. 9 (0900), wherein the radiation probe (0910) comprises the radiation detector (0911) having a background radiation detector and a measurement radiation detector. The background radiation is subtracted from the measured radiation to produce a resulting radiation value that is used by a Minimum Detectable Activity (MDA) algorithm (0926) running under control of software running on the computing device (0921) and executed from a computer readable medium. This radiation deduction operation improves the overall radiation measurement reliability by eliminating background radiation noise from the resulting measured radiation value.

The MDA algorithm (0926) also incorporates information from the spatially-aware sensor (SAS) (0919) to determine whether the radiation measurement value can be considered reliable. This preferred exemplary invention embodiment also may incorporate a database of alarm triggers and/or messages (0927) that when applied to the results of the MDA (0926) result in instructions presented by the user interface (0923) for action by the operator (0924).

Measurement Driven Operator Instruction (1000)

Figure 10:
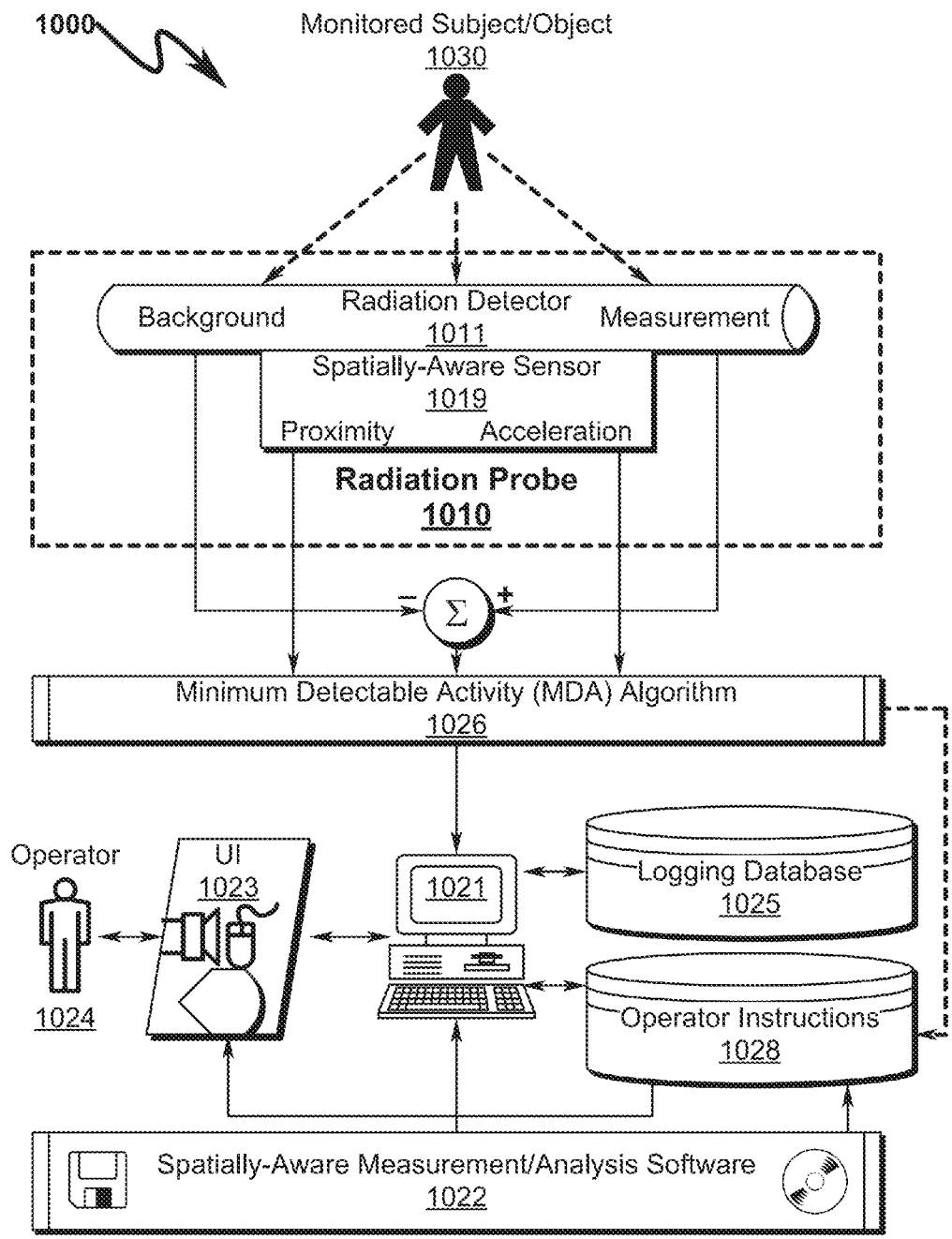
FIG. 10 illustrates a system diagram describing a presently preferred system context for the present invention illustrating a preferred exemplary system incorporating radiation-driven operator instructions.

The present invention may be configured in some preferred embodiments as generally depicted in FIG. 10 (1000), wherein the spatially-aware measurement/analysis software (1022) in conjunction with the minimum detectable activity (MDA) algorithm (1026) combine to select operator instructions (1028) from a database that are then presented via a user interface (1023) to an operator (1024) for action. This configuration permits the computing device (CD) (1021) to direct operator (1024) coordination of the radiation measurement process.

This capability may be implemented in a wide variety of ways, including but not limited to LED displays, audible alarms, LCD display panels, voice commands, and other user interface methodologies. This functionality permits the operator activity during the measurement process to be tightly controlled and thus improve the overall measurement reliability and repeatability, even in situations where the operator is inexperienced with radiation measurement techniques or completely unfamiliar with the operation of the radiation probe (1010).

CD Directed Operator Compliance (1100)

Figure 11:
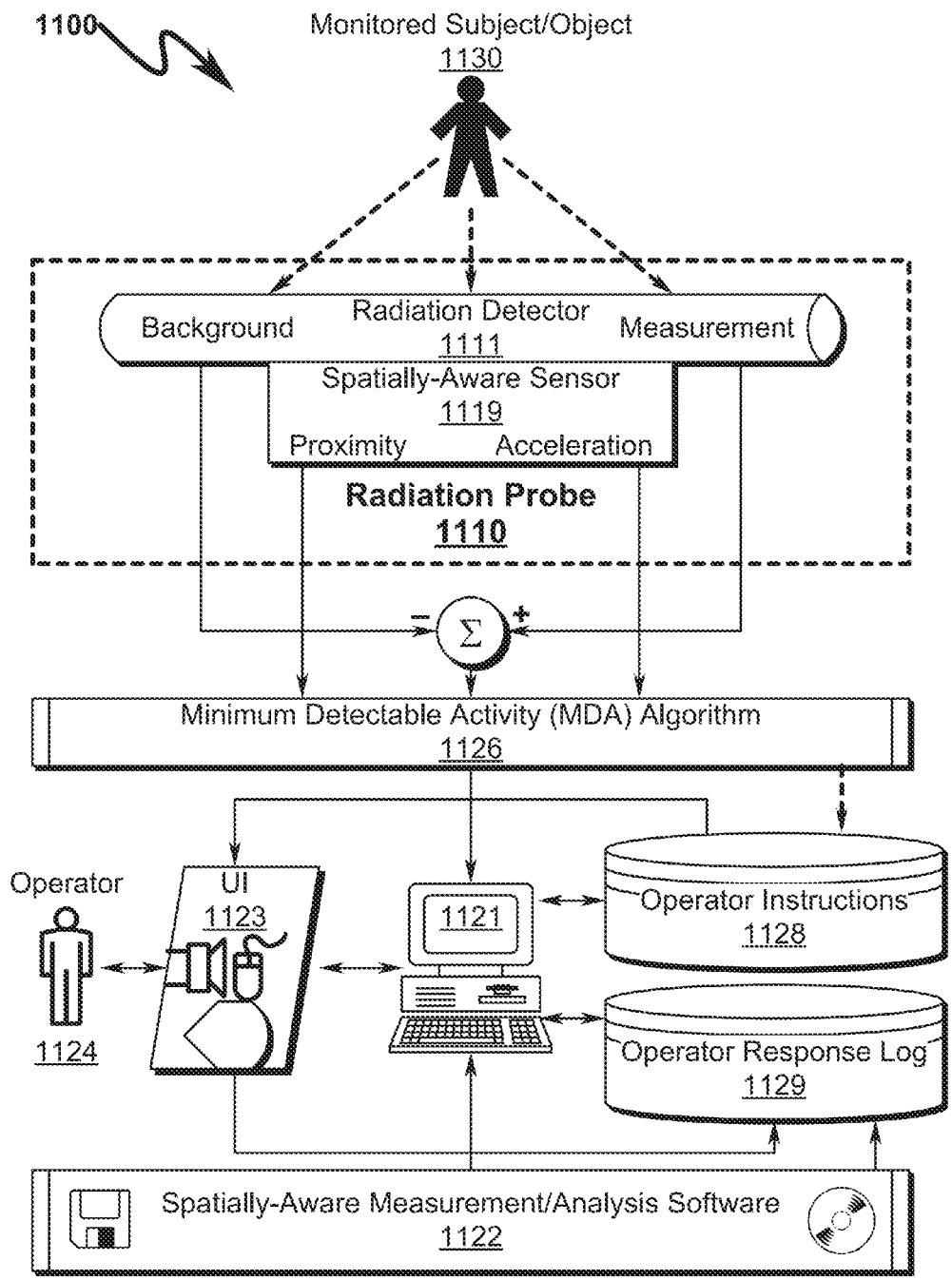
FIG. 11 illustrates a system diagram describing a presently preferred system context for the present invention illustrating a preferred exemplary system incorporating radiation-driven operator instructions and computing device directed operator compliance.

As generally depicted in FIG. 11 (1100), the present invention may be configured with a database of operator instructions (1128) that is coordinated with an operator response log (1129) to ensure that the operator is in compliance with standardized procedures for radiation measurement. This capability is accomplished as follows. The computing device (CD) (1121) executing spatially-aware measurement analysis software (1122) read from a computer readable medium collects radiation data from the radiation probe (1110) (comprising radiation measurements (1111) and spatial information (1119)) and determines using the MDA algorithm (1126) whether the measurements can or should be used in determining if alarm conditions are reliable. This information is then used to request the operator (1124) via instructions from an operator database (1128) to perform tasks that manipulate the radiation probe (1110) and/or monitored subject/object (1130) in order to achieve MDA values that correspond to reliable radiation measurement results.

The operator (1124) responses to these instructions (1129) are then logged in an operator response log database (1129). This operator response log database (1129) may contain identification information regarding the operator (1124), the a unique identifier for the computing device (1121) or radiation probe system, the time the event occurred, specific spatial movement patterns associated with the radiation probe (1110) and proximity to the monitored subject/object (1130), the requested operator instruction, the resulting operator action, whether any events triggered an alarm, and whether the MDA value indicated a valid alarm. Key information included here for the purposes of compliance is whether the operator (1124) was able to successfully accept instruction to obtain reliable MDA values or whether the instructions were ignored or incorrectly executed by the operator (1124). This information can then be used for training purposes to improve operator (1124) performance or to identify operators (1124) who may be failing in their duty to diligently frisk the monitored subject/object (1130) with the radiation probe (1110). In the former instance additional training (or more detailed tutoring from the operator instructions database (1128)) may be necessary. In the latter case the operator (1124) may need some form of additional monitoring or discipline to ensure that the scanning duties are performed in a competent manner.

CD Directed Operator Instruction Detail (1200)

Figure 12:
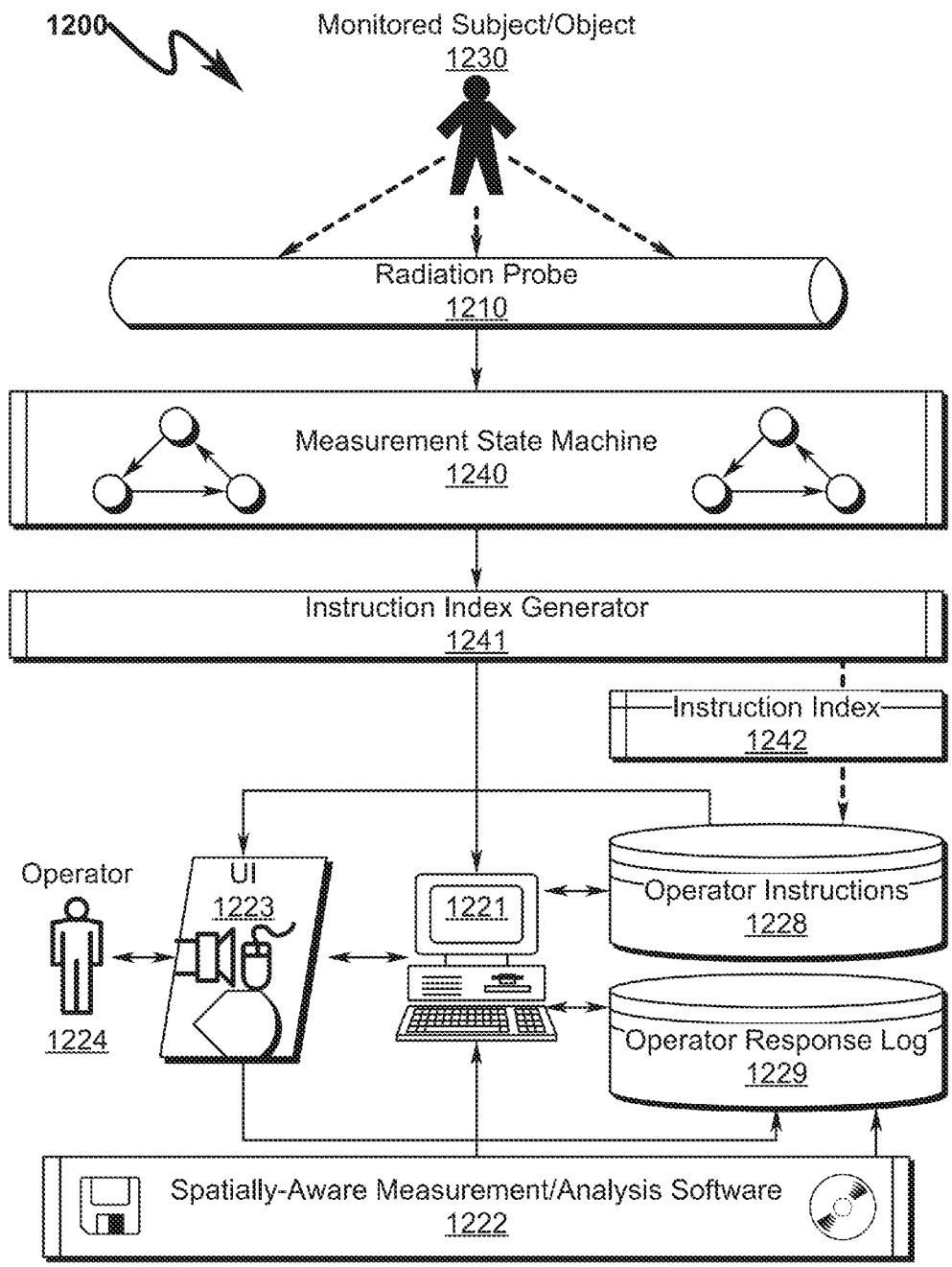
FIG. 12 illustrates a system diagram describing a presently preferred system context for the present invention illustrating a preferred exemplary system incorporating radiation-driven operator instructions and details of computing device directed operator instruction messaging.

As generally depicted in FIG. 12 (1200) and discussed previously, the present invention may be configured with a database of operator instructions (1228) that is coordinated with an operator response log (1229) to ensure that the operator is in compliance with standardized procedures for radiation measurement. FIG. 12 (1200) provides additional detail on how this functionality may be integrated within a more general context of the invention. Here the radiation probe (1210) provides information (radiation measurements, spatial information, etc.) into a measurement state machine (1230) that is responsible for determining which of several states the measurement process is currently operating. While the examples depicted herein have discussed a tri-state model for this state machine having STANDBY/STATIC/DYNAMIC states, the present invention is not necessarily limited to this tri-state model.

From each state within the measurement state machine (1240), an instruction index generator (1241) generates an instruction index (1242) which is then used to select operator instructions (1228) from a database. These instructions may have a wide variety of formats and be presented in a variety of languages for a variety of sophistication levels and may be customized for specific industries. For example, welders may be requested to scan their welding helmets and gloves separately from their bodies; plumbers may be requested to scan their pipe dies; etc. These operator instructions, the measurement state machine (1240), and/or instruction index generator (1242) need not be locally resident on the computing device (1221), but may be remotely accessed via a computer network (i.e. the Internet) in some embodiments. This remote maintenance of the measurement state machine (1240) and its various "soft" components permits instant upgrades to the operational capability of the radiation probe as well as a method to provide a wide range of application "profiles" that may "overlay" the radiation probe functionality and provide context-specific support for a wide range of radiation monitoring applications.

In some application contexts the operator instructions (1228) may take the form of HTML or other application programming languages that permit a graphical presentation on the user interface (1223) in order to instruct the operator (1224) in a graphical way as to what procedures are to be followed when manipulating the radiation probe (1210). In this particular application the user interface (1223) may incorporate a touch-sensitive LCD display or the like to serve as the main form of user communication and may also incorporate voice/speech commands to the operator (1224) using audio commands stored in the operator instructions database (1228).

Dynamic History-Driven Operator Instruction Detail (1300)

Figure 13:
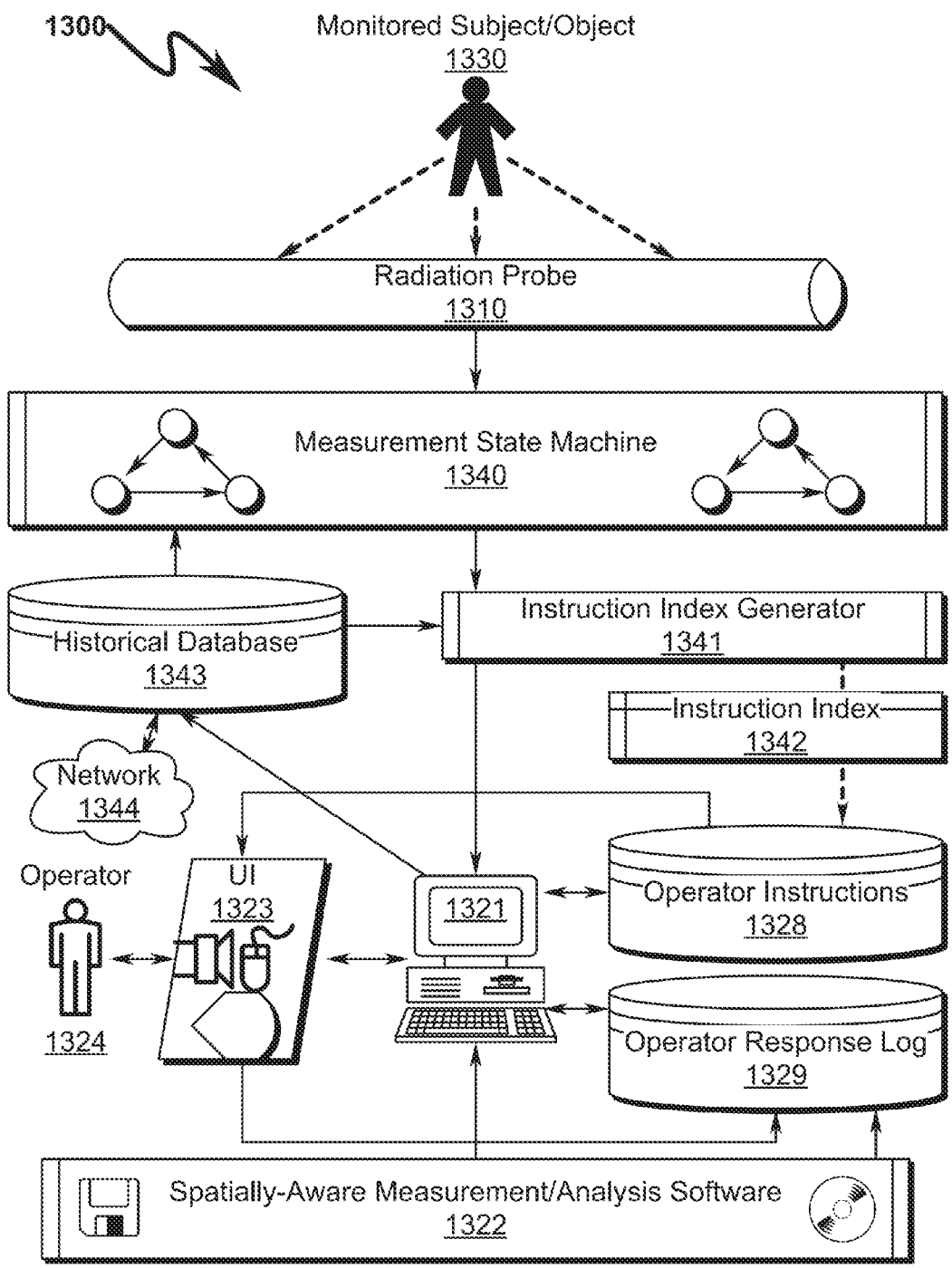
FIG. 13 illustrates a system diagram describing a presently preferred system context for the present invention illustrating a preferred exemplary system incorporating operator instructions dynamically driven by historical data.

As generally depicted in FIG. 13 (1300), the generalized embodiment of FIG. 12 (1200) may be augmented in some preferred embodiments with a historical database (1343) that is used by the state machine (1340) in configuring the instruction index generator (1341). In this configuration the historical database (1343) may be used to dynamically dictate the type of operator instruction given to the operator (1324) given prior measurement result for the operator (1324) or other measurement results that have been obtained from different operators. This information may be tied to GPS or other coordinates of the RD or other identifying/tracking information for the radiation probe (1310). Furthermore, the historical database may be made available via a computer network (1344).

Radiation Monitoring Supervisory Control System Detail (1400)

Figure 14:
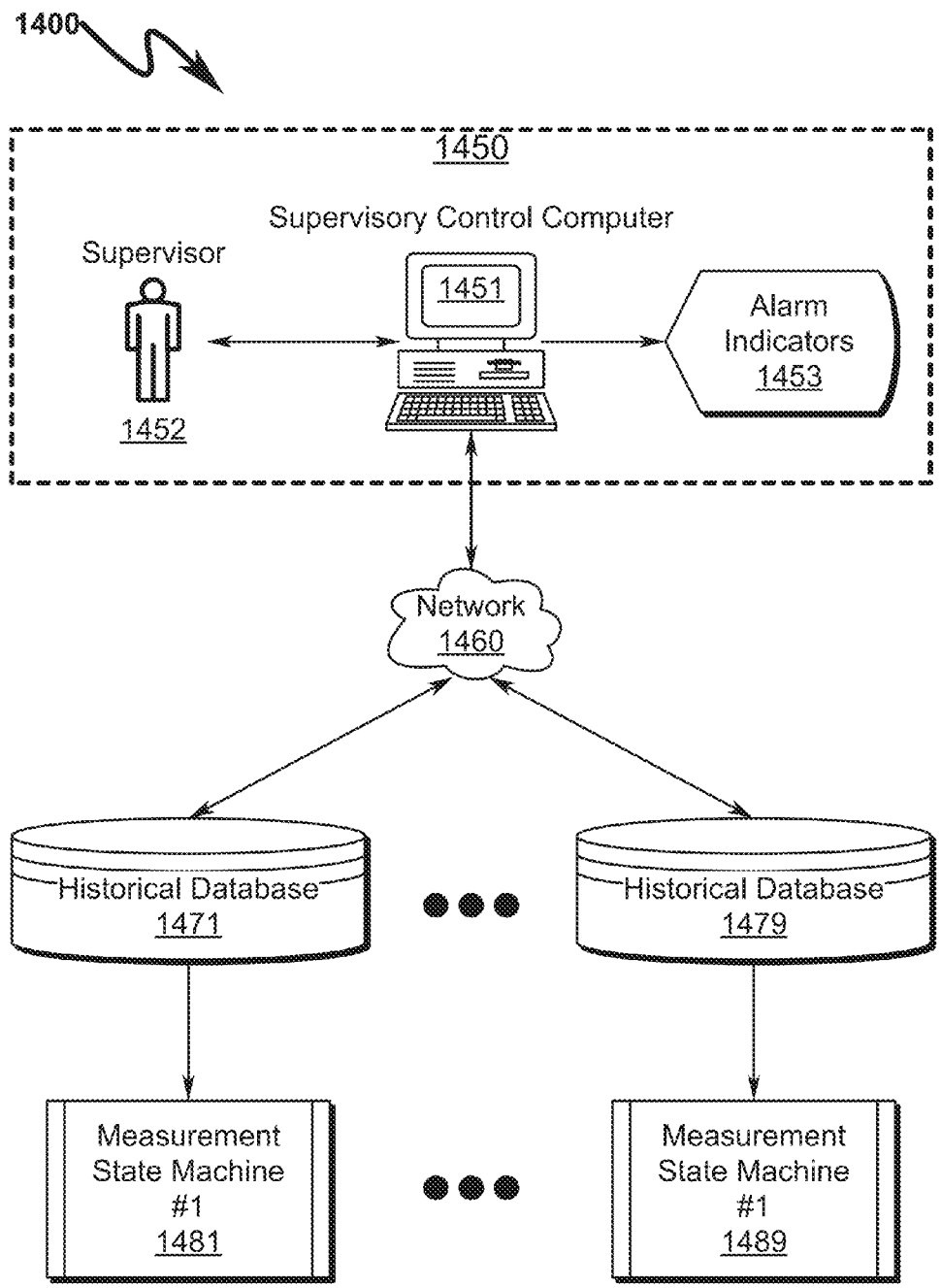
FIG. 14 illustrates a system diagram describing a presently preferred system context for the present invention illustrating a preferred exemplary system incorporating operator instructions dynamically driven by a central supervisory computing system.

As generally depicted in FIG. 14 (1400), the generalized history-driven embodiment of FIG. 13 (1300) may be augmented in some preferred embodiments with remote supervisory control (1450) such that a number of historical databases (1471,1479) serve to both drive their respective state machine (1481,1489) decision processes but also incorporate control information from a supervisory computer system (1451) that may be coordinating radiation monitoring over a wide geographic area. Within this context a centralized supervisor (1452) may be provided with a variety of alarm indicators (1453) or other messages in order to both track and identify trends in radiation measurements that may be taken over a wide geographic area. While not limitive of the present invention scope, a preferred network (1460) for this application is the Internet.

Operator Supervision Profiles (1500)

Figure 15:
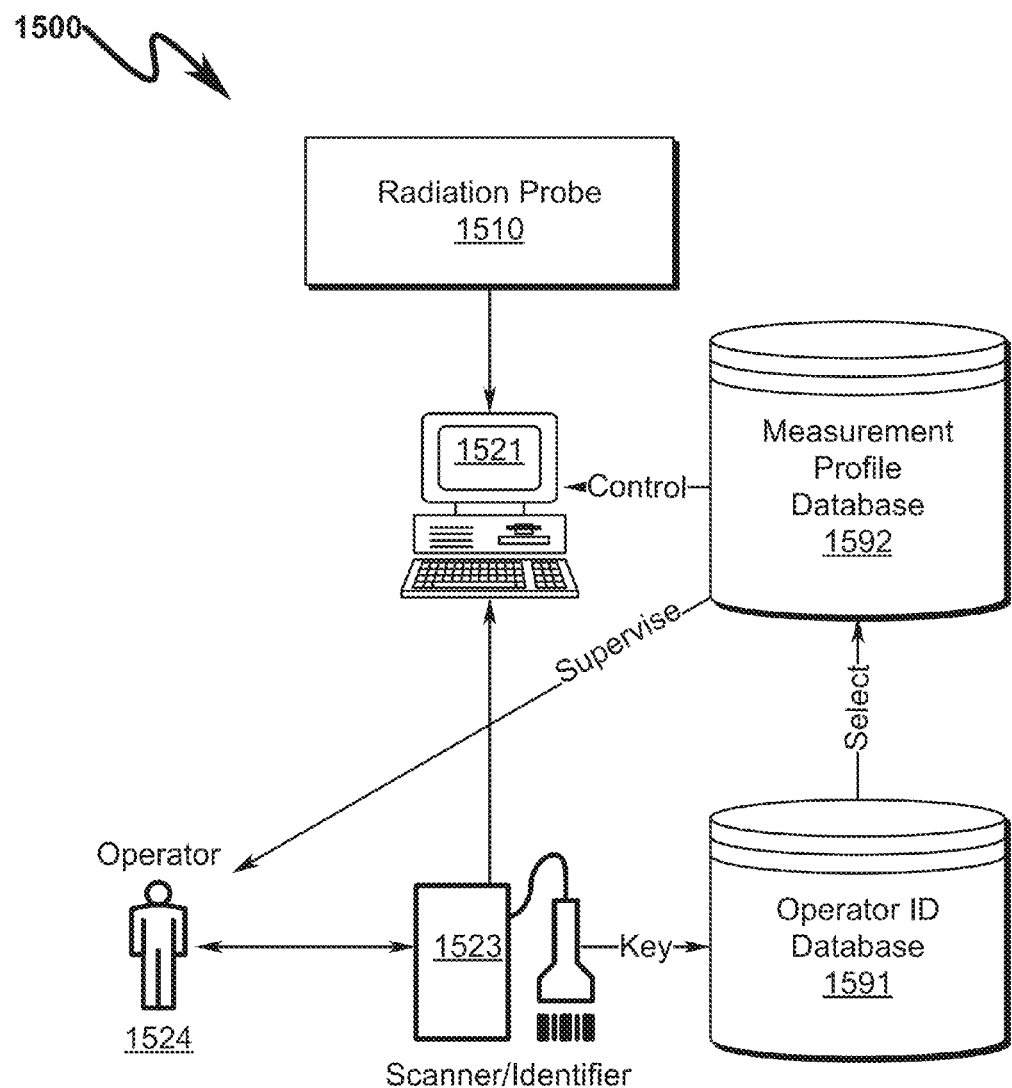
FIG. 15 illustrates a preferred exemplary system embodiment wherein supervisory radiation measurement control of the operator is directed by profiles taken from a database that is linked to unique identification of the operator.

As generally depicted in FIG. 15 (1500), the present invention anticipates that the radiation probe (1510) may interact with the computing device (1521) in a manner that is unique to a given operator (1524). In the exemplary scenario illustrated in FIG. 15 (1500), the operator (1524) may be identified using some type of scanning device (1523) such as a bar code scanner, RFID scanner, etc. that then communicates this operator identification information to the computing device (1521). The operator identification information is then used to index an operator ID database (1591) that selects operator-specific instructions from a measurement profile database (1592). This measurement profile may include such items as preferred language, level of sophistication, skill level, craft or occupation, etc. Thus, the operator (1524) instruction as to the radiation monitoring procedures may be tailored individually or to specific groups of operators serviced by the radiation monitoring system. As with all other databases described herein, the operator ID database (1591) and measurement profile database (1592) may be remotely accessed via the Internet or some other network in many preferred invention embodiments.

Risk Management (1600)

The present invention may in many preferred embodiments permit improved risk management with respect to radiation measurements. Traditional radiation measurement techniques rely on obtaining a sufficient signal-to-noise ratio between the background radiation level detected and the actual measured radiation value in order to define an "alarm" event in which contamination is indicated. This can create problems where the background radiation is such that it is comparable to the detected radiation signal. In these circumstances, a common condition with the prior art is for the radiation detector alarm to "false trigger" and produce erroneous results that are often ignored by the operator.

Figure 16:
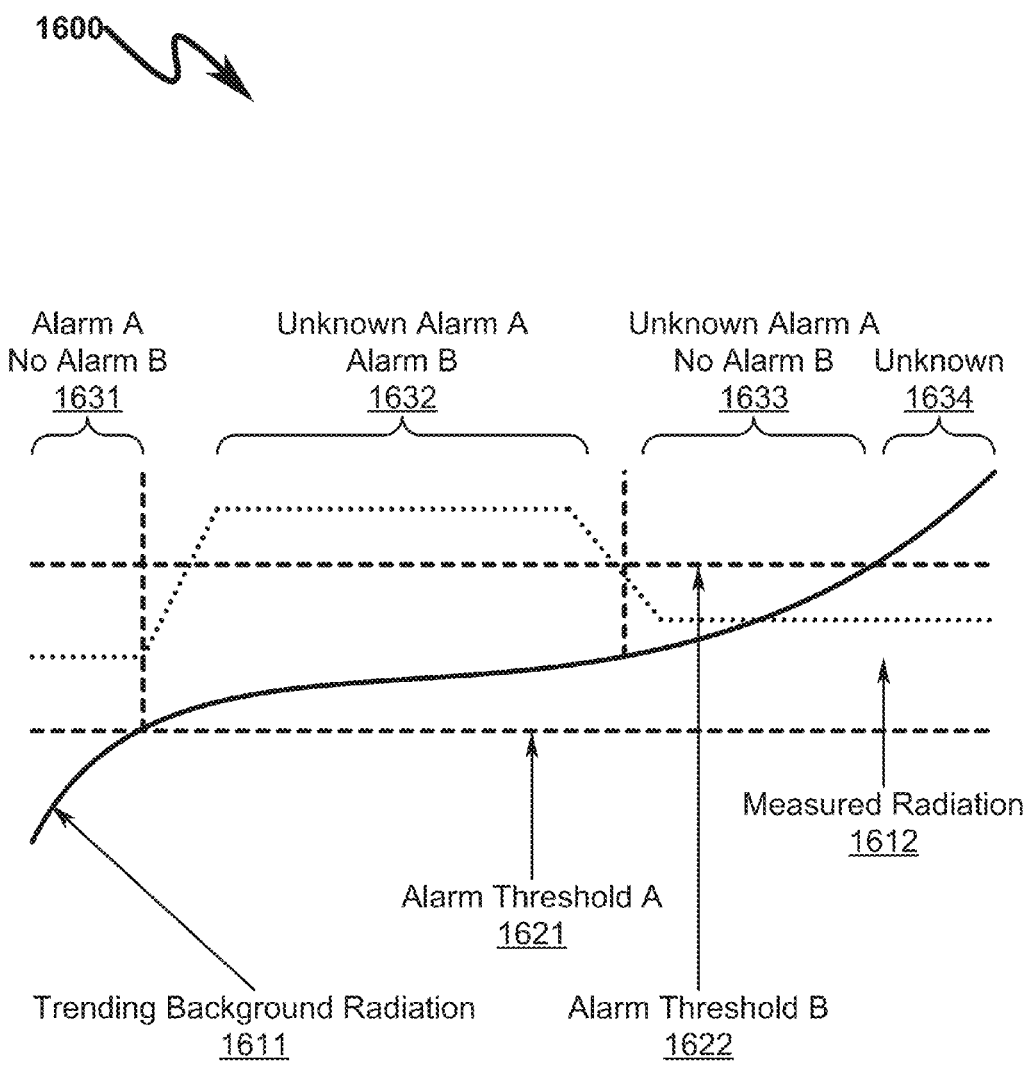
FIG. 16 illustrates the concept of risk management as addressed by many preferred invention embodiments.

As generally illustrated in FIG. 16 (1600), the present invention takes an approach wherein the detection alarms may be qualified by the MDA values calculated that take into account the trending background radiation, the detector integration time, and the mode of detection (counting or frisking). Within this context the trending background radiation (1611) and measured radiation (1612) values are indicated. The various alarm thresholds indicated (1621, 1622) may be adjusted by the operator in order to set an upper bound on the detected radiation value that is measured. For example, if Alarm A threshold (1621) is selected, then the measured radiation value (1612) would trigger a valid alarm in one area (1631) but would be considered as unknown in the remaining areas (1632, 1633, 1634). Upward adjustment of the alarm threshold to the Alarm B setting (1622) would result in no alarm in one region (1631), a valid alarm in a second region (1632), no alarm in a third region (1633), and an unknown condition in the fourth region (1634).

The advantage of this approach to alarm qualification is that it permits the operator to adjust the alarm thresholds such that when an alarm is detected (and shown to be valid as a result of analysis by the MDA algorithm), it ensures that the alarm is indeed valid and that the radiation measurement constitutes real contamination at a known minimum level. Similarly, if the alarm threshold is elevated after detecting false background radiation alarms, the new heightened alarm threshold is the upper bound on contamination if no valid alarm is triggered. This ability to place an upper bound on contamination permits what is called "risk management" to occur in the radiation measurement process. While the radiation measurement may not be as accurate as desired due to excessive background radiation, it can be made relatively precise as to the upper bound on potential radiation contamination, which is a significant improvement over the prior art measurement techniques. Thus, a valid measurement that is both accurate and precise can be obtained by allowing the operator to dynamically change the alarm thresholds in response to prompting by the computing device with instructions as to the current MDA thresholds possible given current background radiation and measurement integration values.

Exemplary System Construction (1700)-(2400)

Figure 17:
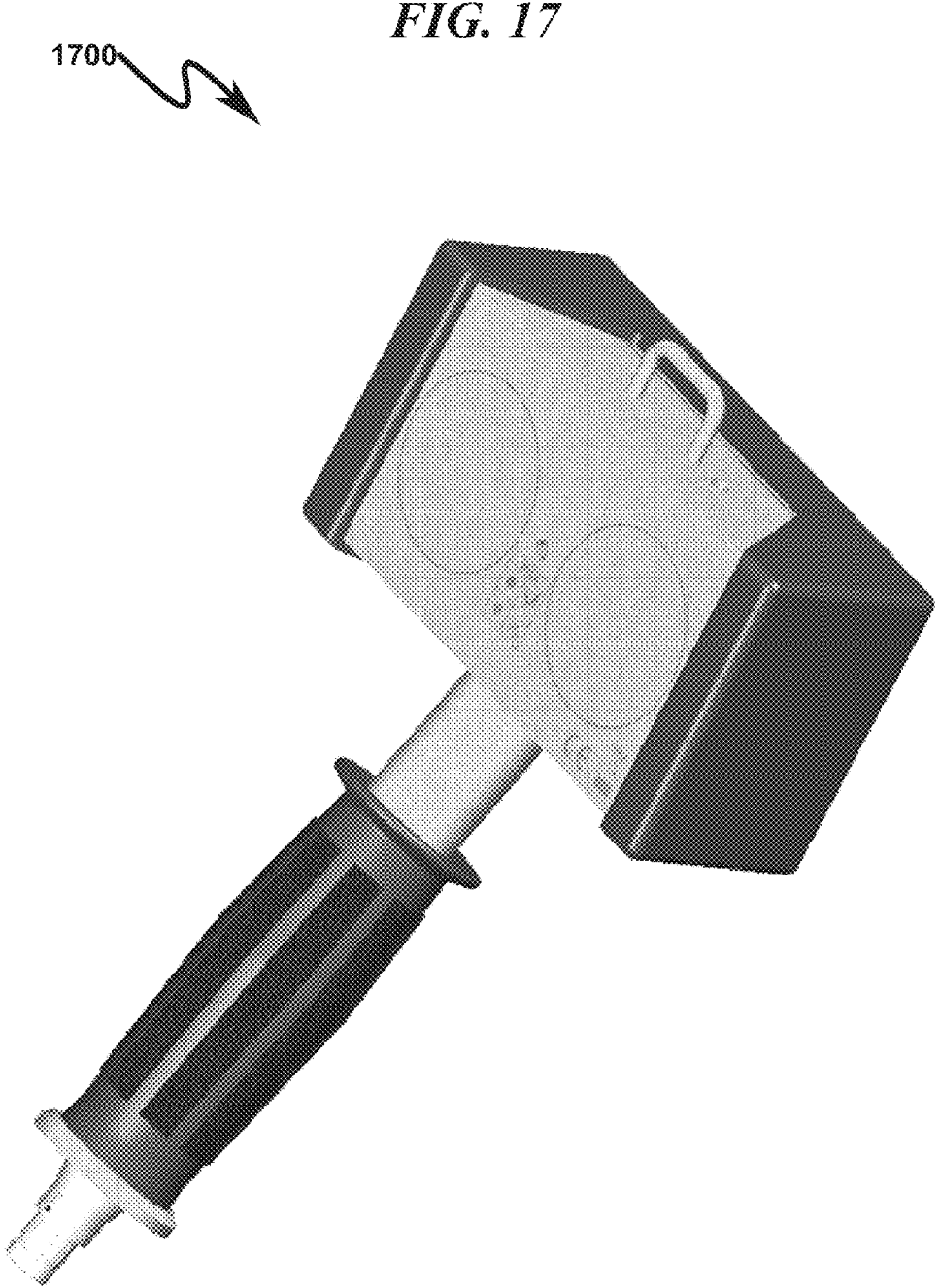
FIG. 17 illustrates a front perspective view of an exemplary embodiment of the present invention.
Figure 18:
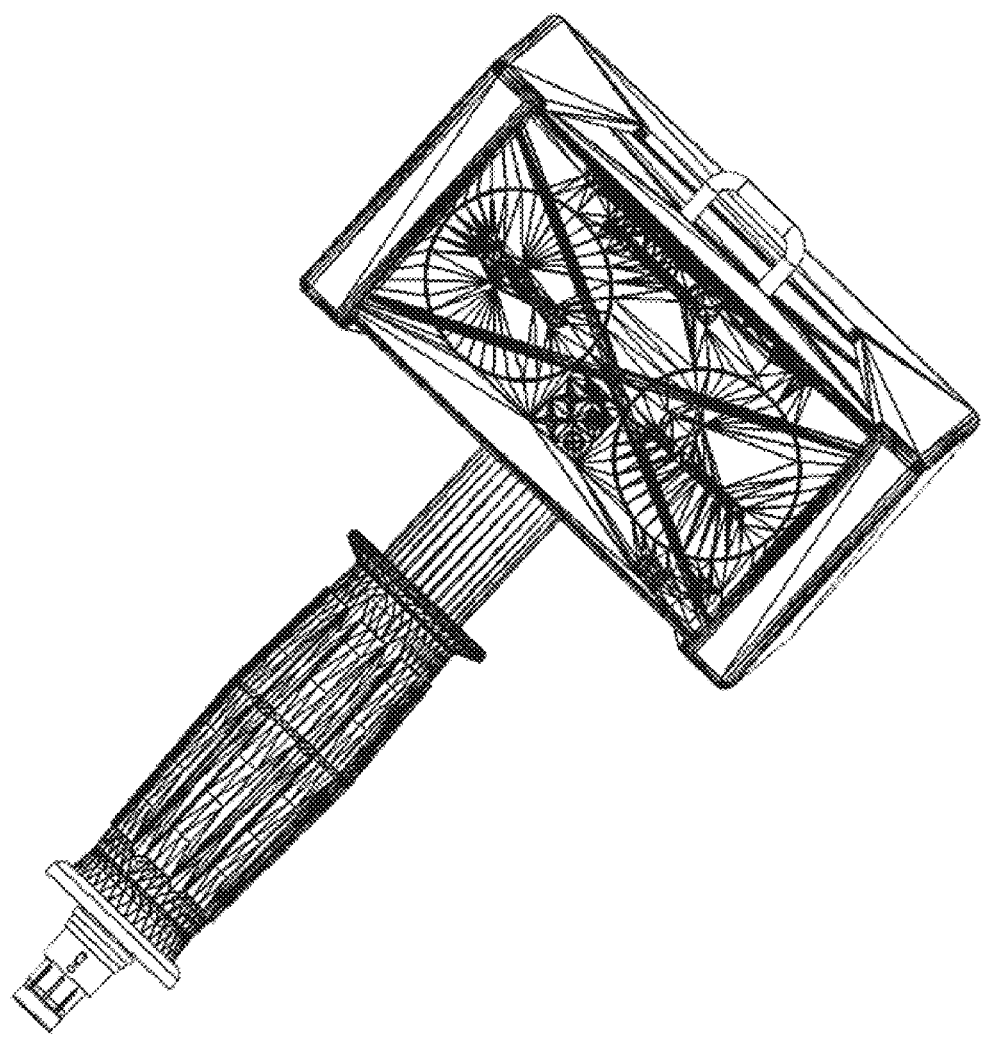
FIG. 18 illustrates a front perspective view of an exemplary embodiment of the present invention.
Figure 19:
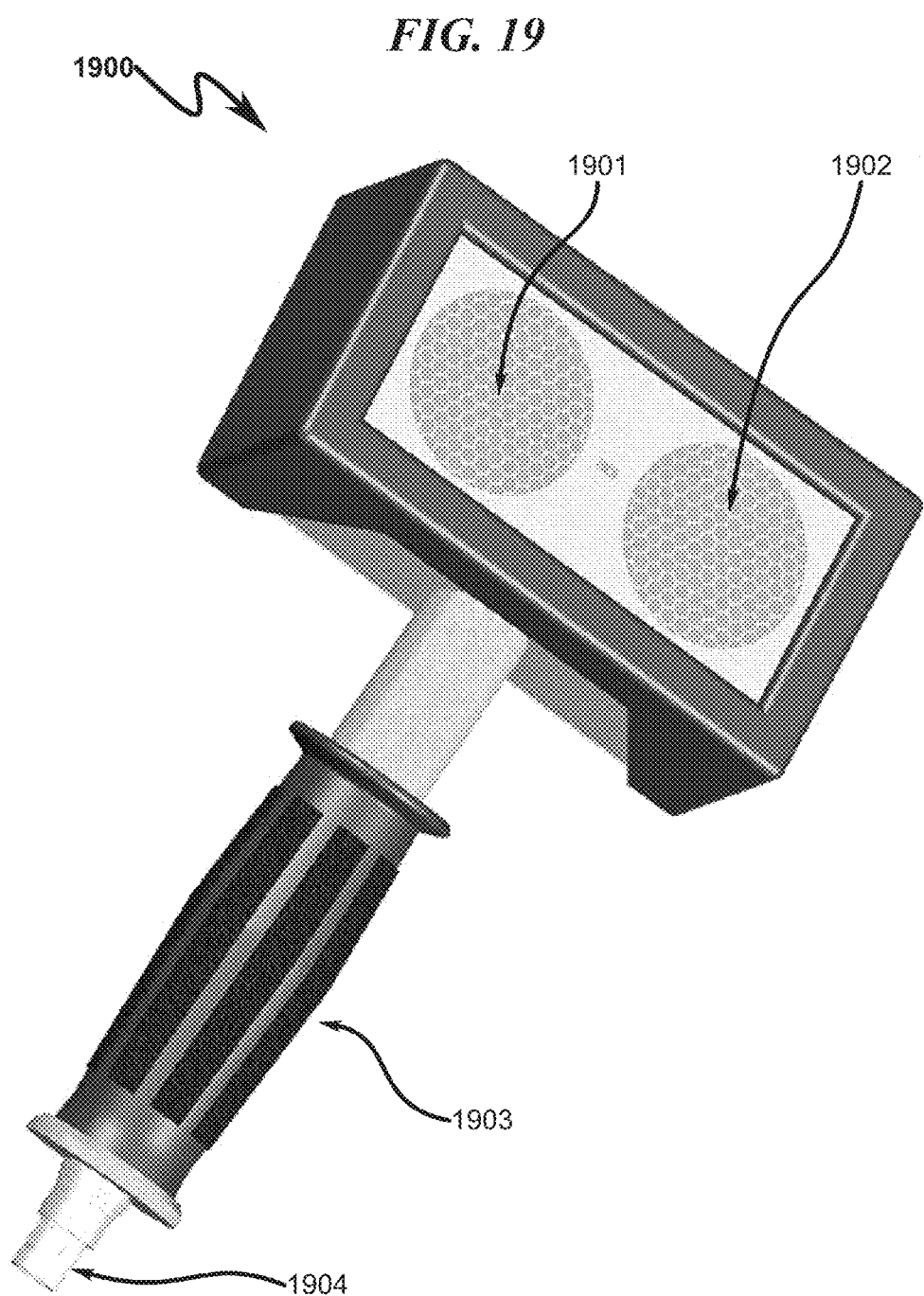
FIG. 19 illustrates a back perspective view of an exemplary embodiment of the present invention.
Figure 20:
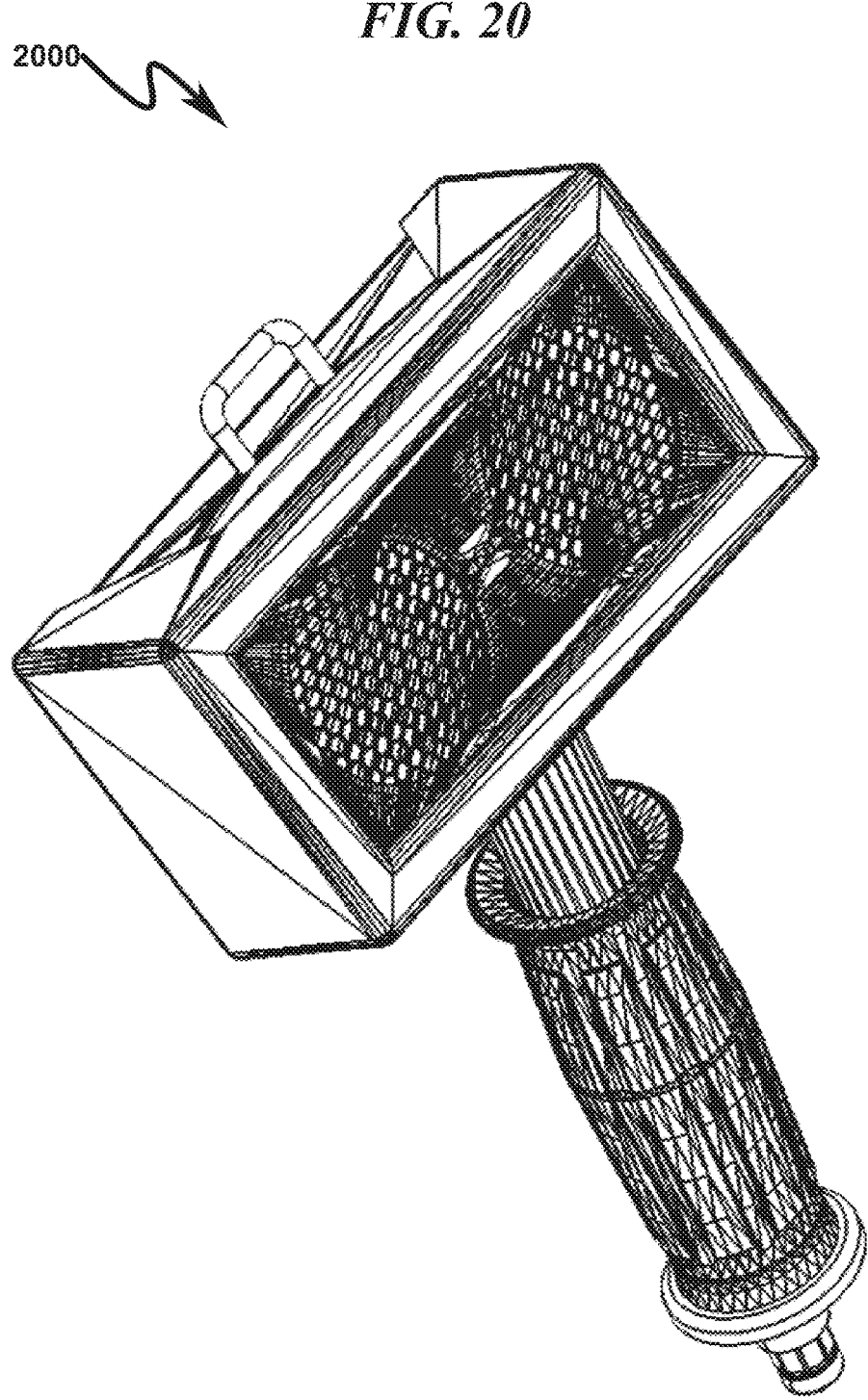
FIG. 20 illustrates a back perspective view of an exemplary embodiment of the present invention.
Figure 21:
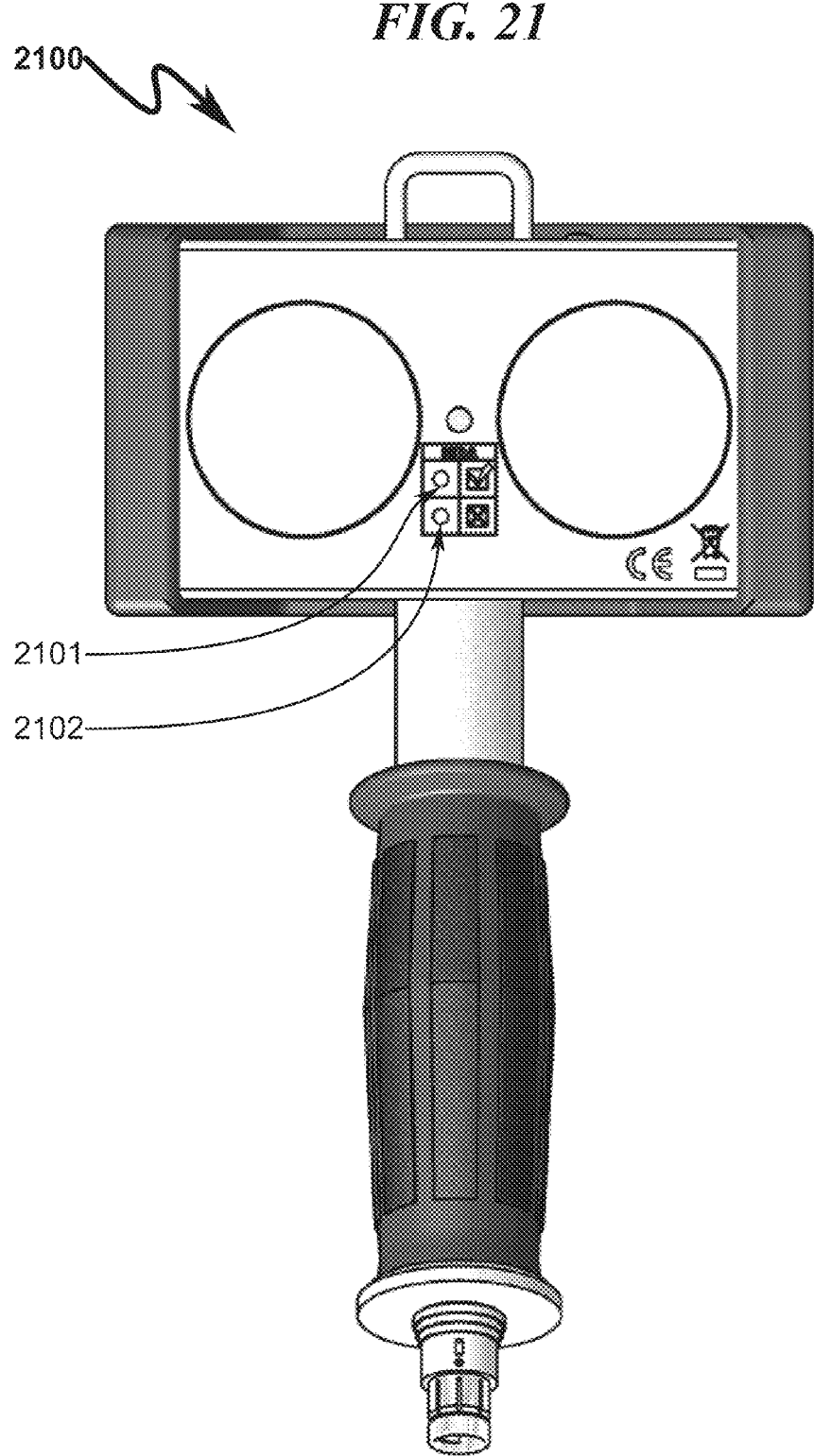
FIG. 21 illustrates a front view of an exemplary embodiment of the present invention.
Figure 22:
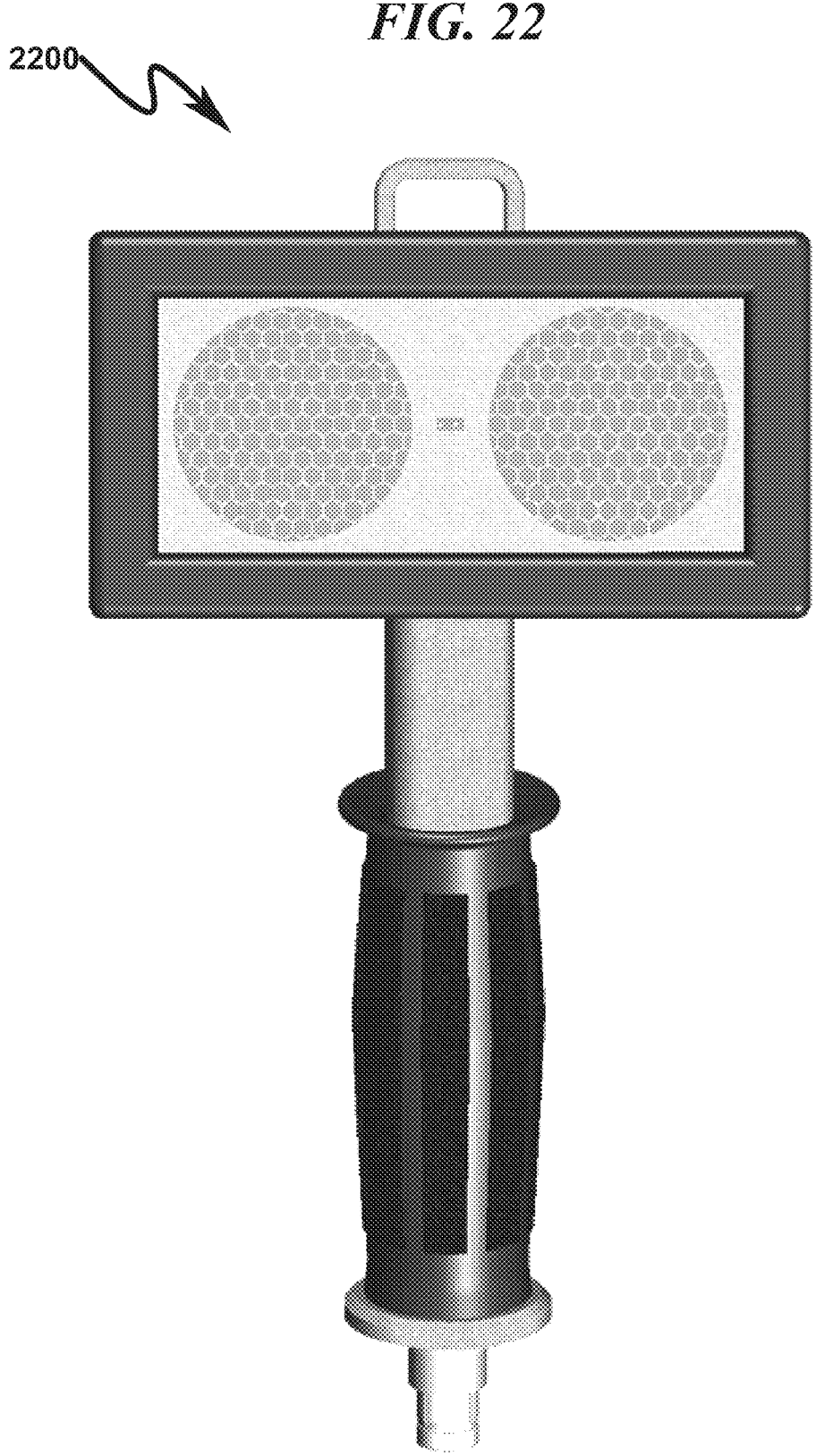
FIG. 22 illustrates a back view of an exemplary embodiment of the present invention.
Figure 24:
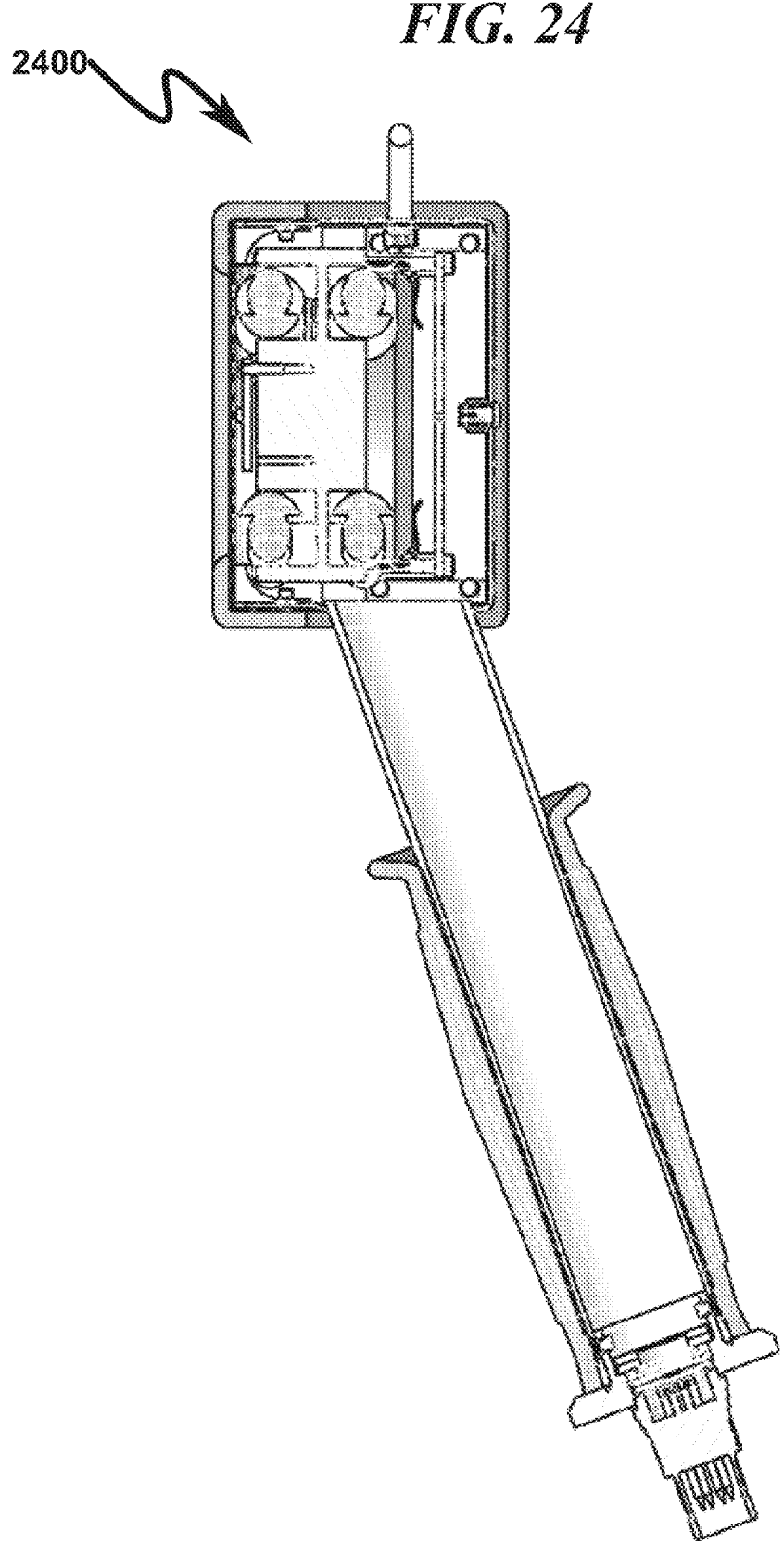
FIG. 24 illustrates a side sectional view of an exemplary embodiment of the present invention.

The present invention may be constructed in a wide variety of forms, but a preferred exemplary embodiment construction is detailed in FIG. 17 (1700)-FIG. 24 (2400). These exemplary views illustrate a typical handheld radiation probe that may incorporate background (1901)/measurement (1902) radiation sensors (collectively the radiation detector (RD)) in conjunction with various visual indicators (2101,2102) to direct the operation of the portable radiation probe by the operator. The incorporation of a handle (1903) and electrical connector (1904) for tethering to a control panel is also anticipated in this exemplary embodiment. This particular exemplary embodiment incorporates simple GO (2101)/NO-GO (2102) indicators for operator feedback, but the use of alphanumeric, voice, and/or other audible feedback is also anticipated within the scope of the invention as described herein.

Figure 23:
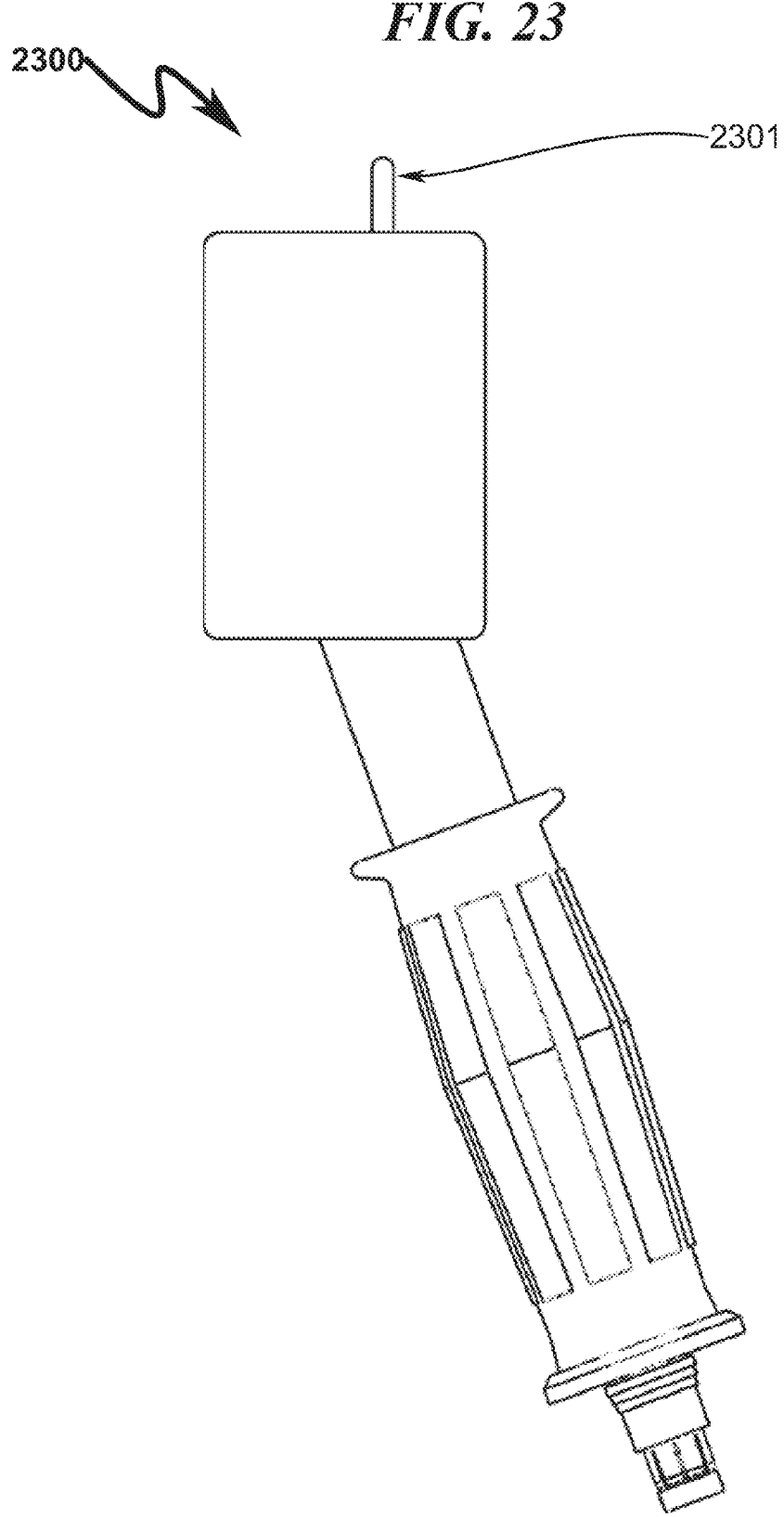
FIG. 23 illustrates a side view of an exemplary embodiment of the present invention.

The side view as generally illustrated in FIG. 23 (2300) illustrates that a support ring (2301) may be incorporated in the design to enable the handheld probe to be stored/supported by a corresponding hook on a stationary probe support station (not shown). It is envisioned that in some preferred embodiments the contact between the support ring (2301) and the corresponding hook on the stationary probe support station may incorporate electronics configured to detect the storage of the handheld probe on the stationary probe support station and when this condition is detected, the handheld probe would be deactivated or placed in a STANDBY mode that prevents false positive radiation detection events/alarms.

Exemplary System Electronics (2500)-(3200)

Figure 25:
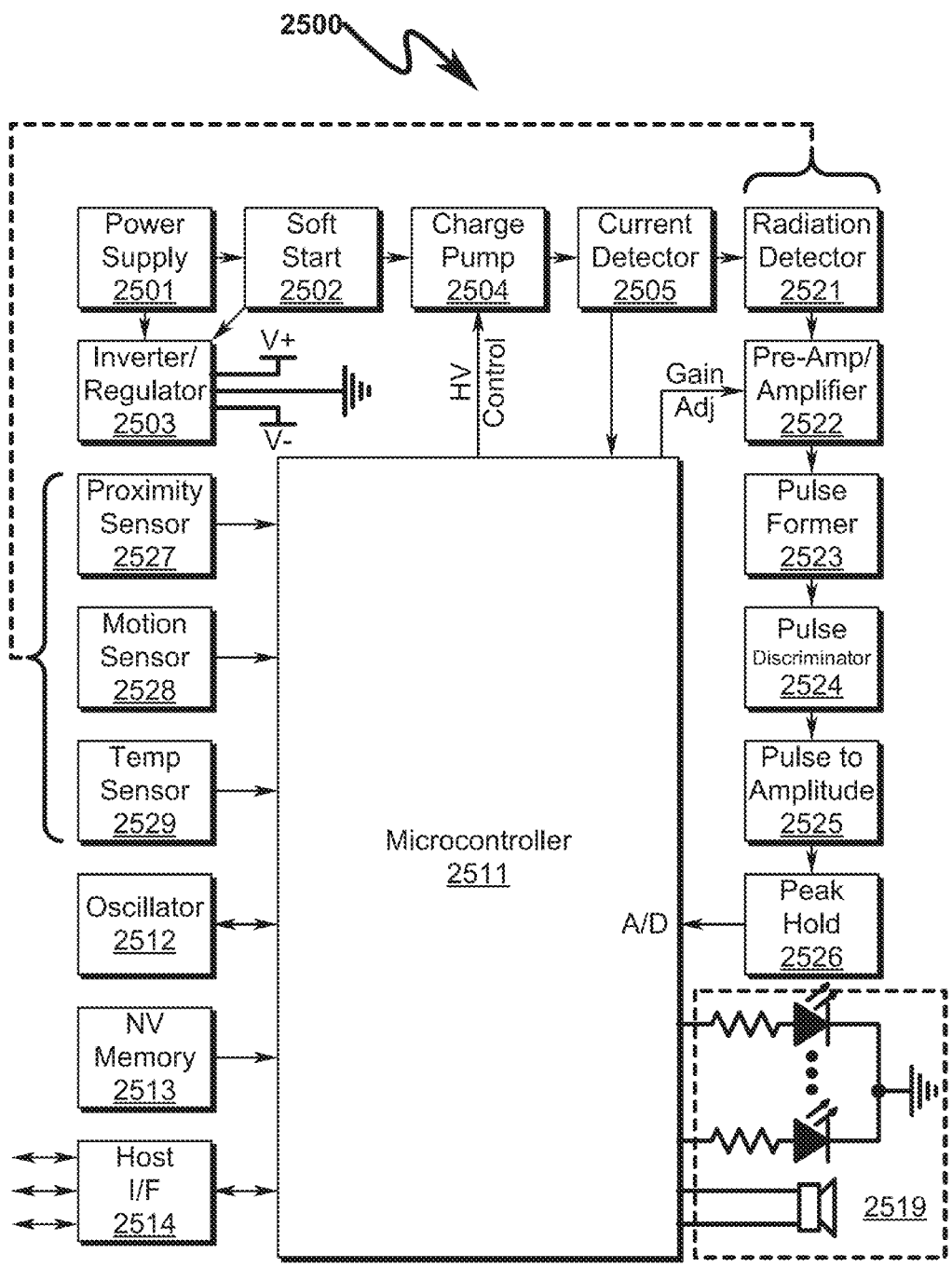
FIG. 25 illustrates an exemplary system block diagram of the electronics used in some preferred exemplary invention embodiments.
Figure 32:
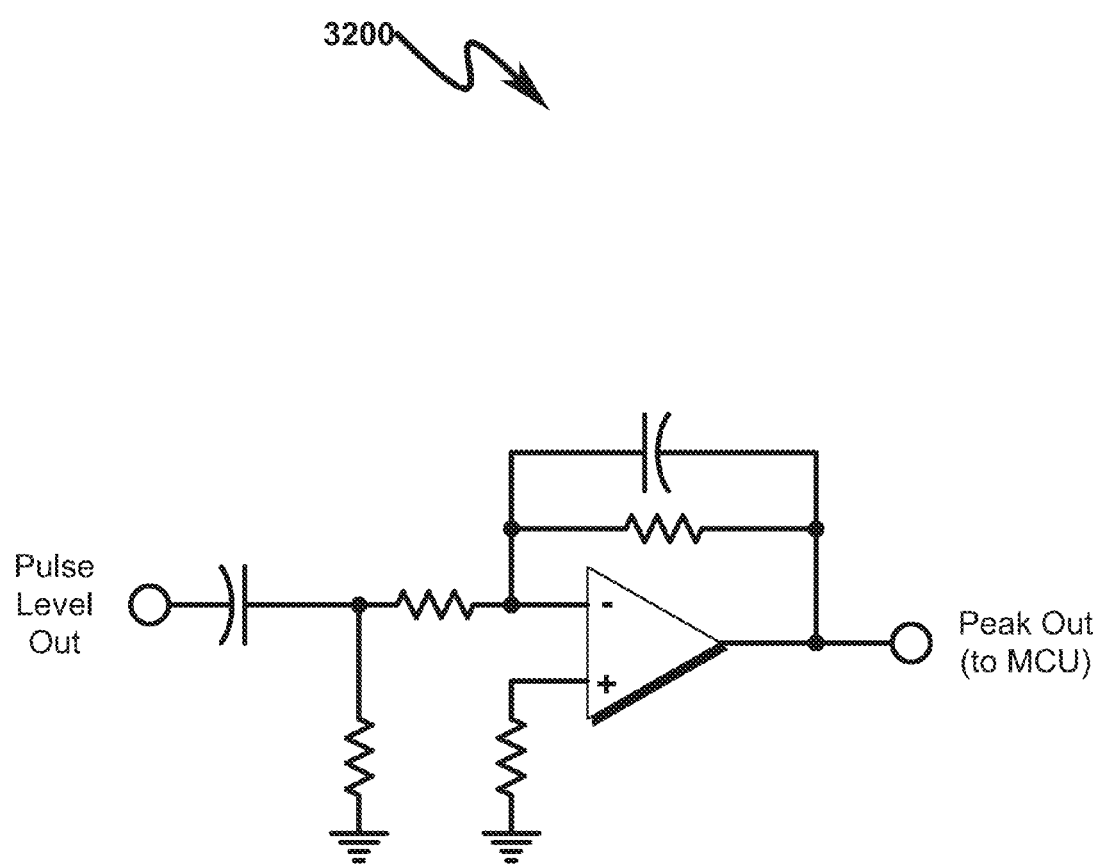
FIG. 32 illustrates an exemplary peak hold circuit schematic useful in some preferred invention embodiments.

While the present invention may be constructed using a variety of electronic system configurations, one preferred exemplary system configuration is generally illustrated in the block diagrams and schematic diagrams of FIG. 25 (2500)-FIG. 32 (3200).

Overview (2500)

Referencing the overview system block diagram of FIG. 25 (2500), the portable application context utilizes a power supply (2501) with soft start circuitry (2502) and an inverter (2503) to provide power to the system components. The soft start circuitry (2502) supplies a charge pump (2504) used to generate high voltage for the radiation detector (2521). A microcontroller (MCU) (2511) or other computing device (CD) controls the charge pump (2504) while monitoring the current consumption (2505) by the radiation detector (2521).

The radiation detector (2521) may have associated with it a preamplifier/amplifier (2522) to amplify the detected radiation signal. This preamplifier/amplifier (2522) may incorporate some form of digital gain control by the microcontroller (2511) to enable a broader dynamic range of radiation measurements to be acquired. The amplified radiation detector signal is then put through a pulse former (2523) and pulse discriminator (2524) to generate a proper pulse envelope which is then converted using a pulse-to-amplitude converter (2525). This resulting amplitude signal is then placed through a sample-and-hold peak detector (2526) and then sampled by an analog-to-digital converter (A/D) within the microcontroller (2511).

The microcontroller (2511) will typically include support circuitry including an oscillator (2512), non-volatile memory (2513), and a variety of host interfaces (USB, serial, Ethernet, etc.) (2514). In addition, the use of a variety of user audio/visual indicators (2519) are typically included to provide measurement coordination commands to the operator.

Exemplary Preamplifier (2600)

Figure 26:
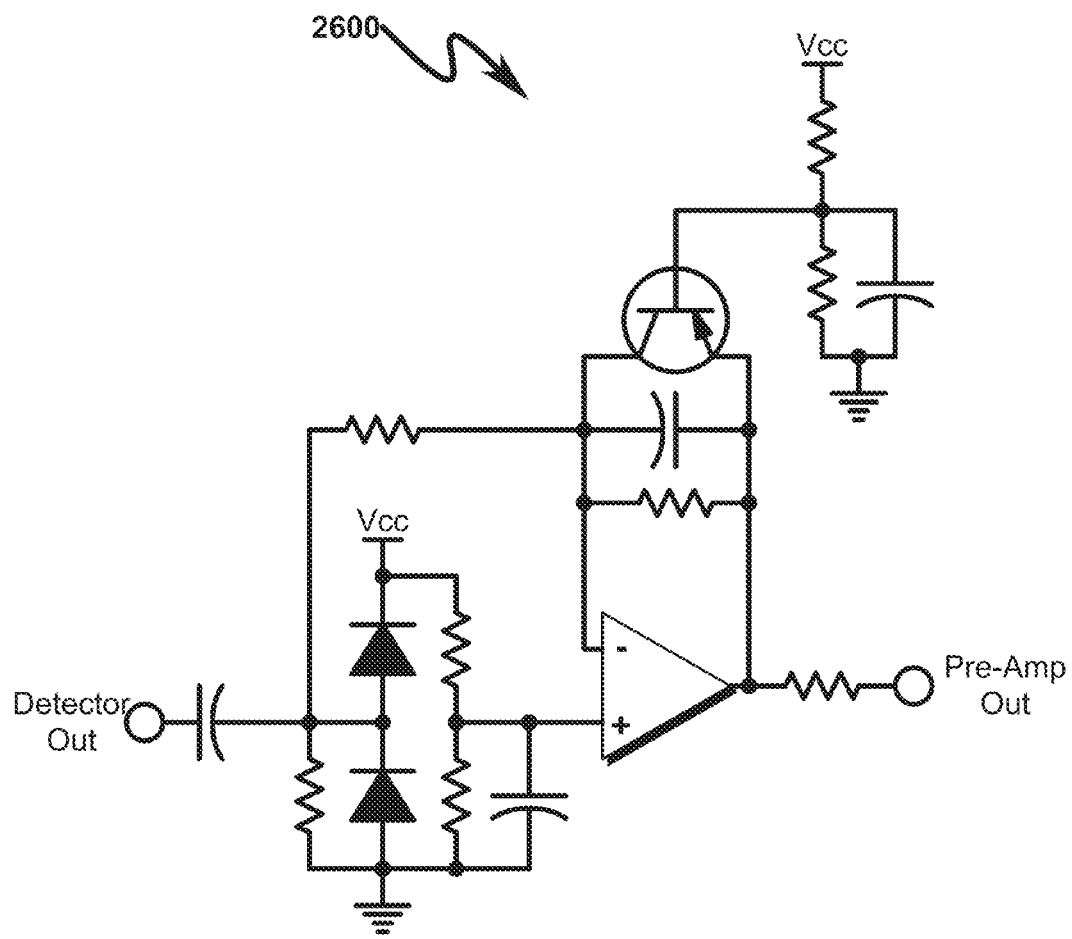
FIG. 26 illustrates an exemplary preamplifier circuit schematic useful in some preferred invention embodiments.

An exemplary preamplifier schematic useful in some preferred invention embodiments is generally illustrated in FIG. 26 (2600). It should be noted that some radiation detectors may not require a preamplifier circuit, whereas some radiation detectors may benefit from the incorporation of a low noise preamplifier located proximal to the detector.

Exemplary Programmable Gain Amplifier (PGA) (2700)

Figure 27:
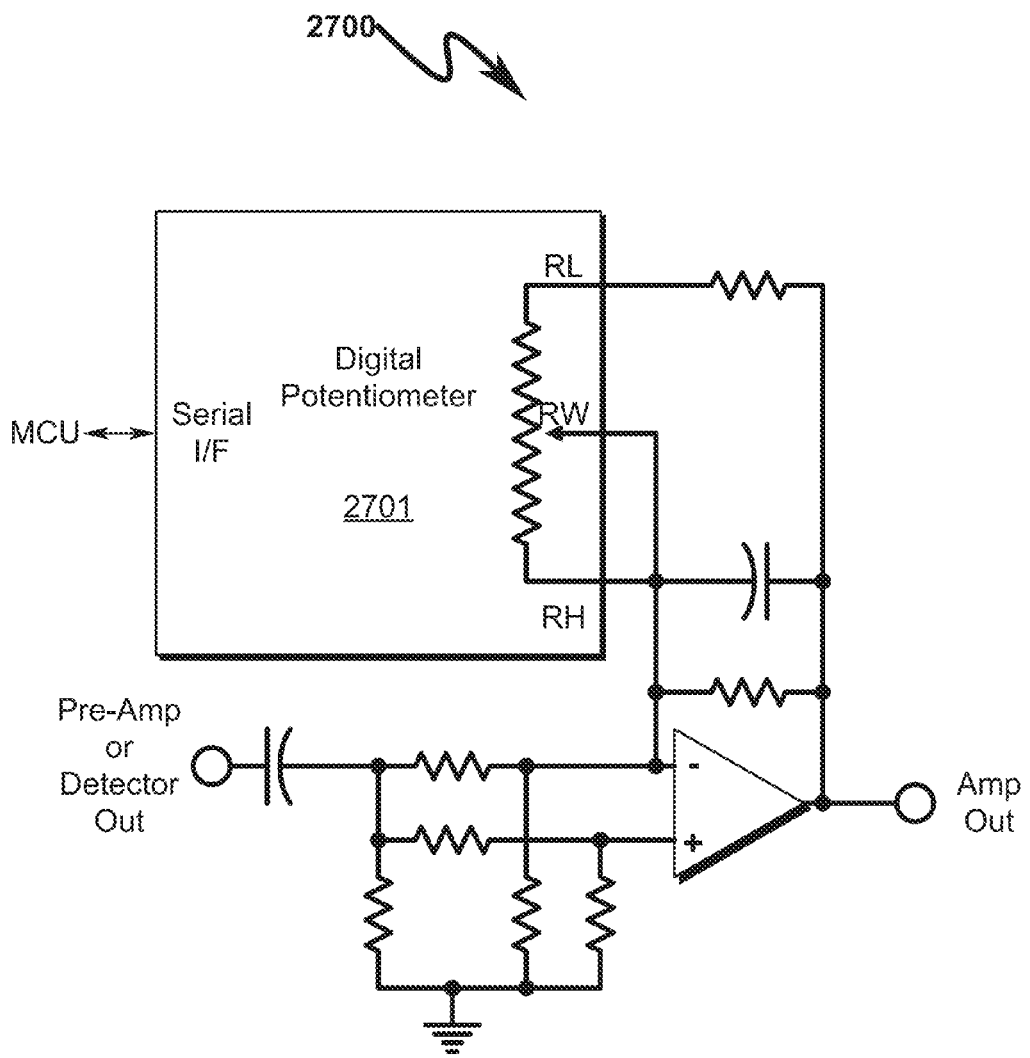
FIG. 27 illustrates an exemplary programmable gain amplifier circuit schematic useful in some preferred invention embodiments.

Some preferred invention embodiments may make use of a programmable gain amplifier (PGA) as generally depicted in FIG. 27 (2700). Within this preferred embodiment, a digital potentiometer (2701) may be utilized to program the gain of the amplifier and thus provide a wider dynamic range for the radiation detector.

It should be noted that the pre-amp/amplifier block (2522) depicted in FIG. 25 (2500) may comprise both the contents of FIG. 26 (2600) and FIG. 27 (2700).

Exemplary Pulse Shaper (2800)

Figure 28:
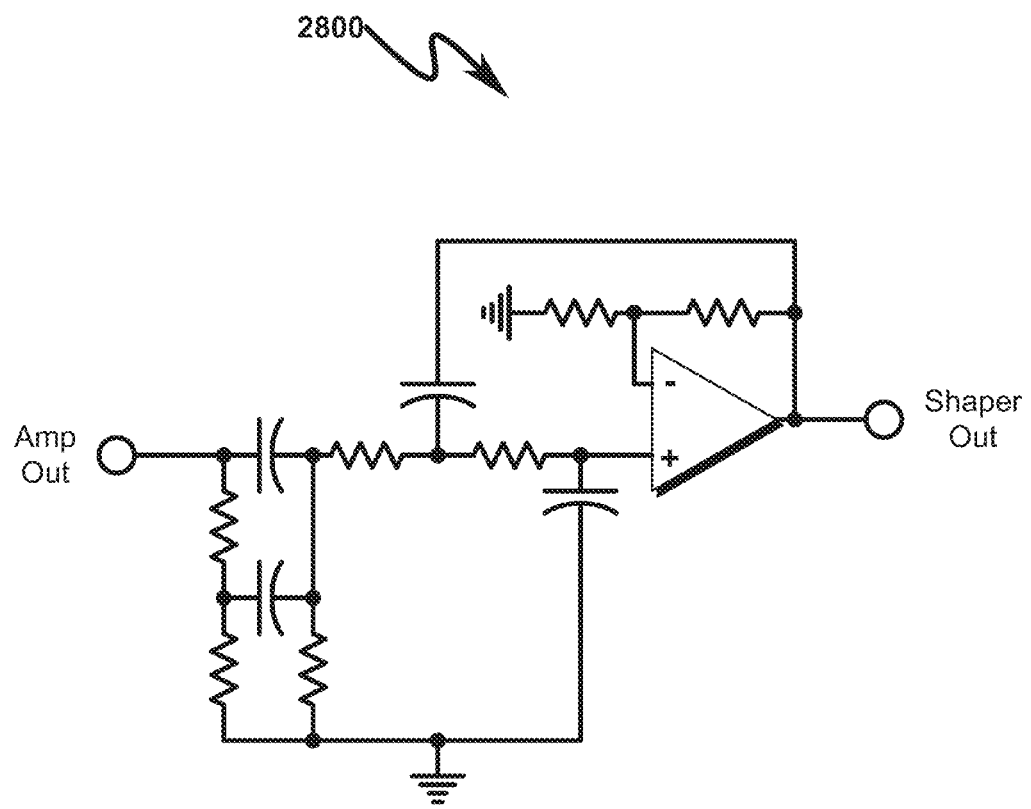
FIG. 28 illustrates an exemplary waveform shaping circuit schematic useful in some preferred invention embodiments.

Some preferred invention embodiments may make use of pulse shaping circuitry as generally depicted in FIG. 28 (2800). Within this preferred embodiment, the amplifier output is conditioned to produce a predetermined pulse profile. This circuit generally functions as the pulse former (2523) block in FIG. 25 (2500).

Exemplary Pulse Discriminator (2900)

Figure 29:
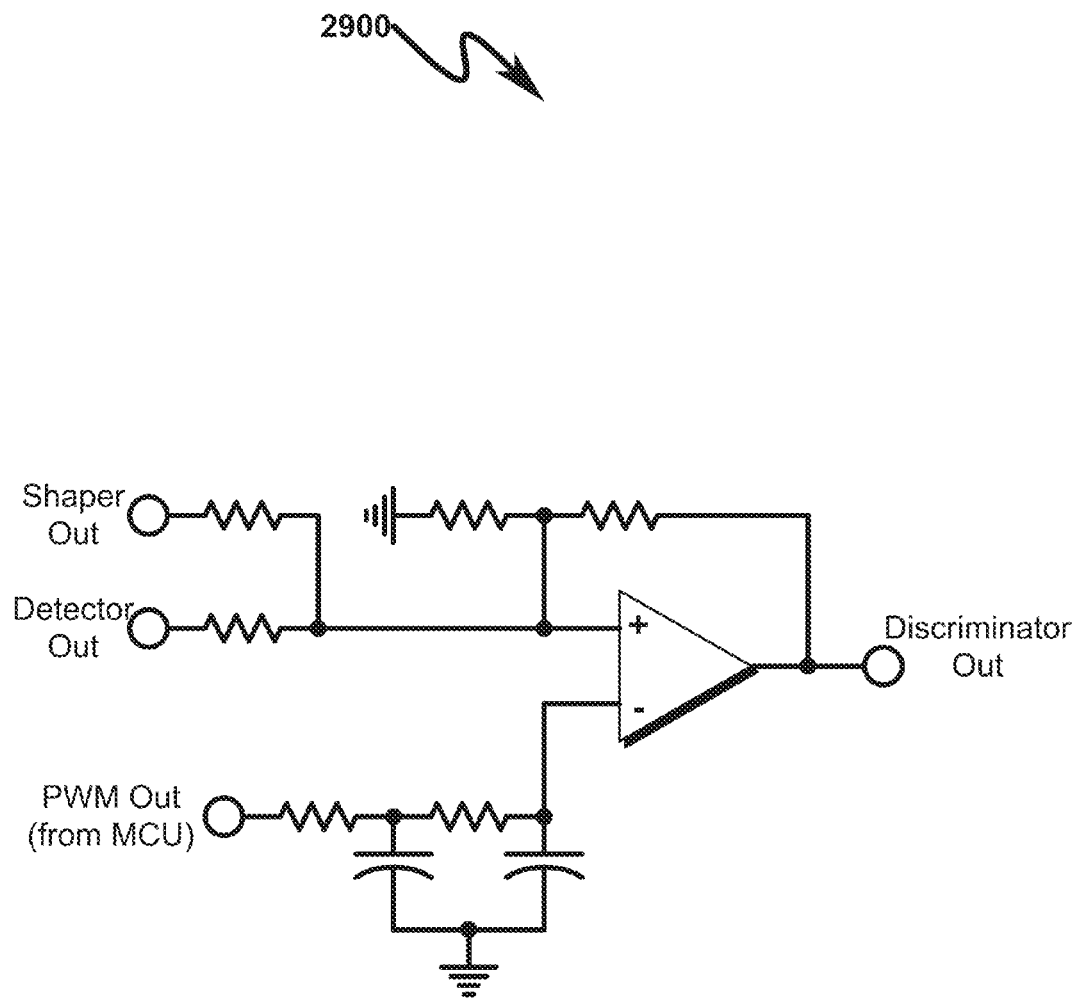
FIG. 29 illustrates an exemplary pulse discriminator circuit schematic useful in some preferred invention embodiments.

Some preferred invention embodiments may make use of pulse discriminator circuitry as generally depicted in FIG. 29 (2900). Within this preferred embodiment, PWM output from the microcontroller is used to determine which pulses are to be considered valid. This circuit generally functions as the pulse discriminator (2524) block in FIG. 25 (2500).

Exemplary Pulse Sampler (3000)

Figure 30:
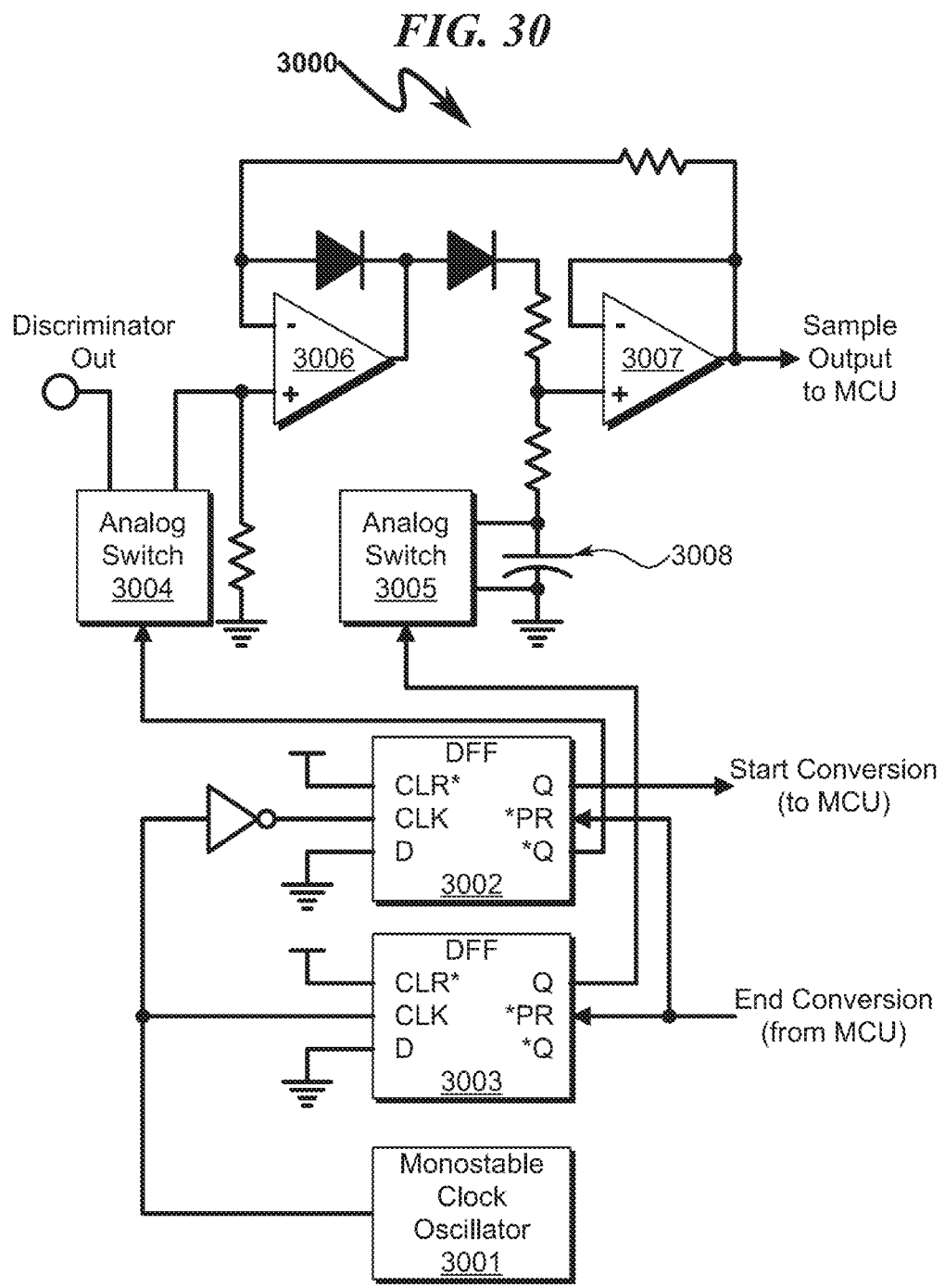
FIG. 30 illustrates an exemplary sample blocker/monostable sampler circuit schematic useful in some preferred invention embodiments.

Some preferred invention embodiments may make use of pulse sampling circuitry as generally depicted in FIG. 30 (3000). Within this preferred embodiment, a monostable multivibrator (clock oscillator) (3001) controls a sample-and-hold circuit that samples the discriminator output for processing by the MCU. This circuit provides periodic sampling information to the MCU as well as permitting the MCU to restart sampling by clearing the sampled value stored in the circuit.

D-flip-flops (3002, 3003) driven by the clock oscillator (3001) serve to provide timing signals to the MCU indicating the start of a conversion and control activation of analog switches (3004, 3005) to sample and then hold the discriminator signal using the operational amplifiers (3006, 3007) and associated peak detection diodes and hold capacitor (3008).

Exemplary Pulse-to-Amplitude Converter (3100)

Figure 31:
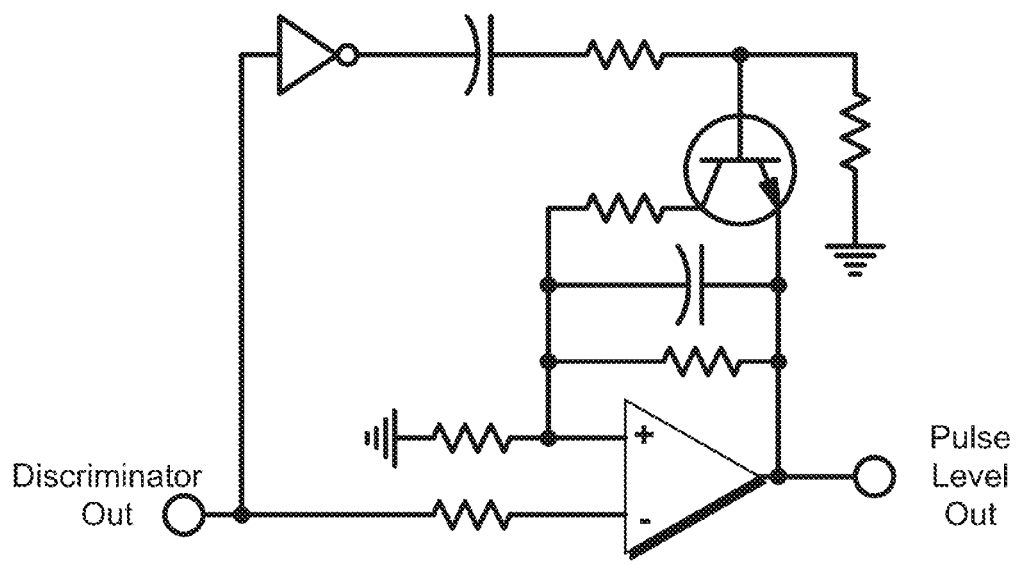
FIG. 31 illustrates an exemplary pulse width converter circuit schematic useful in some preferred invention embodiments.

Some preferred invention embodiments may make use of pulse-to-amplitude conversion circuitry as generally depicted in FIG. 31 (3100). Within this preferred embodiment, the discriminator output is converted into an amplitude level output. The output of this circuit is then fed into a peak detector (FIG. 32 (3200)) for later inspection by the MCU. This circuit generally functions as the pulse-to-amplitude (2525) block in FIG. 25 (2500).

Exemplary Pulse Peak Detector (3200)

Some preferred invention embodiments may make use of pulse peak detector circuitry as generally depicted in FIG. 32 (3200). Within this preferred embodiment, the pulse level output is peak detected for transmission to the MCU for further processing. This circuit generally functions as the peak hold (2526) block in FIG. 25 (2500).

Exemplary Component Selection

While a wide variety of components may be selected for a given system construction given specific application requirements, the following component list may be advantageously used in several preferred invention embodiments:
Microcontroller—MICROCHIP® model PIC24FJ64GA306.
Accelerometer—ST Microelectronics model LIS302DL 3-axis MEMS motion sensor.
Proximity Sensor—OSRAM® model SFH7773 proximity sensor.
Temperature Sensor—National Semiconductor model LM61CIM3.

One skilled in the art will recognize that this list is exemplary and does not limit the invention scope.

Temperature Compensation

As generally illustrated herein, many preferred invention embodiments may incorporate a temperature sensor that is used to perform temperature compensation for the radiation sensor and other measurement subsystems within the overall application context.

Preferred Embodiment System Summary

The present invention preferred exemplary system embodiment anticipates a wide variety of variations in the basic theme of construction, but can be generalized as a spatially-aware radiation probe system comprising:
(a) radiation detector (RD);
(b) spatially-aware sensor (SAS);
(c) computing device (CD);
wherein
the RD is configured to detect radiation;
the RD is physically coupled to the SAS;
the SAS is configured to detect a spatial parameter associated with the spatial context of the RD;
the RD is electrically coupled to the CD and configured to transmit information on the detected radiation to the CD;
the SAS is electrically coupled to the CD and configured to transmit the spatial parameter to the CD; and
the CD is configured to generate measurement coordination commands (MCC) that supervise the measurement of the detected radiation based on the spatial parameter received from the SAS.

This general system summary may be augmented by the various elements described herein to produce a wide variety of invention embodiments consistent with this overall design description.

Alternate Preferred Embodiment System Summary

A present invention alternate preferred exemplary system embodiment anticipates a wide variety of variations in the basic theme of construction, but can be generalized as a spatially-aware radiation probe system comprising:
(a) radiation detector (RD);
(b) spatially-aware sensor (SAS);
(c) computing device (CD);
wherein
the RD is configured to detect radiation;
the RD is physically coupled to the SAS;
the SAS is configured to detect a spatial parameter associated with the spatial context of the RD;
the RD is electrically coupled to the CD and configured to transmit information on the detected radiation to the CD;
the SAS is electrically coupled to the CD and configured to transmit the spatial parameter to the CD;
the CD is configured to generate measurement coordination commands (MCC) that supervise the measurement of the detected radiation based on the spatial parameter received from the SAS; and
the CD is configured to execute instructions in a state machine comprising:
(1) STANDBY mode in which status alarms are deactivated;
(2) FRISKING mode in which the CD collects background radiation information from the RD; and
(3) COUNTING mode in which the CD collects static radiation measurements from the RD and determines a CONTAMINATION/NO CONTAMINATION status based on the static radiation measurements.

This general system summary may be augmented by the various elements described herein to produce a wide variety of invention embodiments consistent with this overall design description.

Preferred Embodiment Method Summary

The present invention preferred exemplary method embodiment anticipates a wide variety of variations in the basic theme of implementation, but can be generalized as a spatially-aware radiation probe method comprising:
(1) measuring radiation of a monitored subject/object using a radiation detector (RD) to generate measured radiation parameters;
(2) detecting the spatial context of the radiation detector and/or monitored subject/object using a spatially-aware sensor (SAS) to generate spatial context parameters;
(3) transmitting the measured radiation and spatial context parameters to a computing device (CD) for analysis;
(4) analyzing the measured radiation parameters using the spatial context parameters;
(5) based on the analysis, determining if corrective operator action is required, and if not, proceeding to step (8);
(6) retrieving operator coordination instructions from an operator measurement coordination database based on the corrective operator action;

(7) issuing operator generate measurement coordination commands (MCC) by the CD to supervise spatial manipulation of the radiation detector by an operator based on data retrieved from the operator coordination database and proceeding to step (1);
(8) modifying/correcting the measured radiation parameters using the spatial context parameters; and
(9) logging the modified/corrected radiation measurement parameters to a computer database controlled by the computing device.

Note that this method may incorporate displays, audible alarms, or other type of human and/or computer interfaces in conjunction with data logging and/or mathematical analysis of the collected radiation detection information. This general method summary may be augmented by the various elements described herein to produce a wide variety of invention embodiments consistent with this overall design description.

Alternate Preferred Embodiment Method Summary

A present invention alternate preferred exemplary method embodiment anticipates a wide variety of variations in the basic theme of implementation, but can be generalized as a spatially-aware radiation probe method comprising:
(1) entering a STANDBY mode in a computing device (CD) in which all radiation alarms are deactivated;
(2) determining with the CD if a spatially-aware sensor (SAS) is active/proximal to a monitored subject/object, and if not, proceeding to step (1);
(3) entering a FRISKING (dynamic) mode in the CD to detect background radiation using a radiation detector (RD);
(4) determining with the CD if the background radiation is at an acceptable level, and if not, proceeding to step (3);
(5) determining with the CD if an alarm has been triggered, and if not, proceeding to step (3);
and wherein state transitions within the state machine are controlled by inputs from the RD and the SAS.

An embodiment wherein the MCC comprises customized radiation measurement profiles retrieved from a remote operator instruction database by said CD via a computer network.

An embodiment wherein the CD is selected from a group consisting of: handheld computer; tablet computer; smartphone; cell phone; and laptop computer.

An embodiment wherein the RD, the SAS, and the CD are integrated into a portable handheld radiation probe.

One skilled in the art will recognize that other embodiments are possible based on combinations of elements taught within the above invention description.

(6) issuing operator generate measurement coordination commands (MCC) by the CD to supervise spatial manipulation of the RD prompting a user to inspect a suspect area on the monitored subject/object using the RD by positioning the RD proximal to the suspect area;
(7) entering a COUNTING mode in the CD;
(8) measuring radiation using the CD from the suspect area of the monitored subject/object using the RD to generate measured radiation value until an accuracy threshold is reached;
(9) determining if the measured radiation value is greater than a threshold for contamination, and if not, proceeding to step (11);
(10) presenting a CONTAMINATION message with the CD to the user and proceeding to step (12);
(11) presenting a NO CONTAMINATION message with the CD to the user; and
(12) terminating the FRISKING/COUNTING modes in the CD and proceeding to step (1).

Note that this method may incorporate displays, audible alarms, or other type of human and/or computer interfaces in conjunction with data logging and/or mathematical analysis of the collected radiation detection information. This general method summary may be augmented by the various elements described herein to produce a wide variety of invention embodiments consistent with this overall design description.

System/Method Variations

The present invention anticipates a wide variety of variations in the basic theme of construction. The examples presented previously do not represent the entire scope of possible usages. They are meant to cite a few of the almost limitless possibilities.

This basic system and method may be augmented with a variety of ancillary embodiments, including but not limited to:

An embodiment wherein the RD is selected from a group consisting of: plastic scintillators; organic scintillators; inorganic scintillators; gas detectors; and semiconductor detectors.

An embodiment wherein the RD comprises a background radiation detector/sensor (BRD) and a measurement radiation detector/sensor (MRD).

An embodiment wherein the SAS comprises a sensor selected from a group consisting of: distance measurement sensor; accelerometer sensor; and axial orientation sensor.

An embodiment wherein the MCC are determined based on a minimum detectable activity (MDA) algorithm applied to said detected radiation.

An embodiment wherein the MCC comprises instructions selected from a group consisting of: visually prompting an operator to spatially position said RD; audibly prompting an operator to spatially position said RD using audible tones; audibly prompting an operator to spatially position said RD using voice commands; and generating operator instructions on a graphical user interface (GUI).

An embodiment wherein the MCC are determined by a state machine configured to operate under control of the CD Generalized Computer Usable Medium In various alternate embodiments, the present invention may be implemented as a computer program product for use with a computerized computing system. Those skilled in the art will readily appreciate that programs defining the functions defined by the present invention can be written in any appropriate programming language and delivered to a computer in many forms, including but not limited to: (a) information permanently stored on non-writeable storage media (e.g., read-only memory devices such as ROMs or CD-ROM disks); (b) information alterably stored on writeable storage media (e.g., floppy disks and hard drives); and/or (c) information conveyed to a computer through communication media, such as a local area network, a telephone network, or a public network such as the Internet. When carrying computer readable instructions that implement the present invention methods, such computer readable media represent alternate embodiments of the present invention.

As generally illustrated herein, the present invention system embodiments can incorporate a variety of computer readable media that comprise computer usable medium having computer readable code means embodied therein. One skilled in the art will recognize that the software associated with the various processes described herein can be embodied in a wide variety of computer accessible media from which the software is loaded and activated. Pursuant to In re Beauregard, 35 USPQ2d 1383 (U.S. Pat. No. 5,710,578), the present invention anticipates and includes this type of computer readable media within the scope of the invention. Pursuant to In re Nuijten, 500 F.3d 1346 (Fed. Cir. 2007) (U.S. patent application Ser. No. 09/211,928), the present invention scope is limited to computer readable media wherein the media is both tangible and non-transitory.

CONCLUSION

A spatially-aware radiation probe system/method allowing for detection and correction of radiation readings based on the position and/or movement of a radiation detector has been disclosed. The system incorporates a radiation detector combined with a spatially-aware sensor to permit detection of spatial context parameters associated with the radiation detector and/or object being probed. This spatial context information is then used by analysis software to modify the detected radiation values and/or instruct the radiation probe operator as to appropriate measurement activity to ensure accurate radiation measurements. The spatially-aware sensor may include but is not limited to: distance sensors to determine the distance between the radiation detector and the object being monitored; accelerometers integrated within the radiation detector to detect movement of the radiation detector; and/or axial orientation sensors to determine the axial orientation of the radiation detector. The method incorporates utilization of a spatially-aware radiation probe so configured to generate accurate radiation measurements under computer-controlled operator supervision and may advantageously be applied to a variety of portable radiation measurement contexts.

Although a preferred embodiment of the present invention has been illustrated in the accompanying drawings and described in the foregoing Detailed Description, it will be understood that the invention is not limited to the embodiments disclosed, but is capable of numerous rearrangements, modifications, and substitutions without departing from the spirit of the invention as set forth and defined by the following claims.

What is claimed is:
1. A spatially-aware radiation probe system comprising:
 (a) radiation detector (RD);
 (b) spatially-aware sensor (SAS); and
 (c) computing device (CD);
 wherein
 said RD is configured to detect radiation;
 said RD is physically coupled to said SAS;
 said SAS is configured to detect a spatial parameter associated with the spatial context of said RD;
 said RD is electrically coupled to said CD and configured to transmit information on said detected radiation to said CD;
 said SAS is electrically coupled to said CD and configured to transmit said spatial parameter to said CD;
 said CD is configured to collect background radiation data from said RD to quantify background radiation levels;
 said CD is configured to collect measurement radiation data from said RD to quantify actual radiation levels for a monitored subject/object; and
 said CD is configured to generate measurement coordination commands (MCC) that supervise the measurement of said detected radiation based on said spatial parameter received from said SAS.

2. The spatially-aware radiation probe system of claim 1 wherein said RD is selected from a group consisting of: plastic scintillators; organic scintillators; inorganic scintillators; gas detectors;
 and semiconductor detectors.

3. The spatially-aware radiation probe system of claim 1 wherein said RD comprises a background radiation detector/sensor (BRD) and a measurement radiation detector/sensor (MRD).

4. The spatially-aware radiation probe system of claim 1 wherein said SAS comprises a sensor selected from a group consisting of: distance measurement sensor; accelerometer sensor; and axial orientation sensor.

5. The spatially-aware radiation probe system of claim 1 wherein said measurement coordination commands (MCC) generated by said computing device (CD) are determined based on a minimum detectable activity (MDA) algorithm applied to said detected radiation.

6. The spatially-aware radiation probe system of claim 1 wherein said measurement coordination commands (MCC) generated by said computing device (CD) comprise instructions selected from a group consisting of: visually prompting an operator to spatially position said RD; audibly prompting an operator to spatially position said RD using audible tones; audibly prompting an operator to spatially position said RD using voice commands; and generating operator instructions on a graphical user interface (GUI).

7. The spatially-aware radiation probe system of claim 1 wherein said measurement coordination commands (MCC) generated by said computing device (CD) are determined by a state machine configured to operate under control of said CD and wherein state transitions within said state machine are controlled by inputs from said RD and said SAS.

8. The spatially-aware radiation probe system of claim 1 wherein said measurement coordination commands (MCC) generated by said computing device (CD) comprise customized radiation measurement profiles retrieved from a remote operator instruction database by said CD via a computer network.

9. The spatially-aware radiation probe system of claim 1 wherein said CD is selected from a group consisting of: handheld computer; tablet computer; smartphone; cell phone; and laptop computer.

10. The spatially-aware radiation probe system of claim 1 wherein said RD, said SAS, and said CD are integrated into a portable handheld radiation probe.

11. A spatially-aware radiation probe method comprising:
 (1) measuring radiation of a monitored subject/object using a radiation detector (RD) to generate measured radiation parameters;
 (2) detecting the spatial context of said radiation detector and/or monitored subject/object using a spatially-aware sensor (SAS) to generate spatial context parameters;
 (3) transmitting said measured radiation and spatial context parameters to a computing device (CD) for analysis;
 (4) analyzing said measured radiation parameters using said spatial context parameters;
 (5) based on said analysis, determining if corrective operator action is required, and if not, proceeding to step (8);
 (6) retrieving, by said CD, operator coordination instructions from an operator measurement coordination database based on said corrective operator action;

(7) issuing operator measurement coordination commands (MCC) by said CD to supervise spatial manipulation of said radiation detector by an operator based on said operator coordination instructions retrieved from said operator coordination database and proceeding to step (1);

(8) modifying/correcting said measured radiation parameters using said spatial context parameters; and (9) logging said modified/corrected radiation measurement parameters to a computer database controlled by said computing device.

12. The spatially-aware radiation probe method of claim 11 wherein said RD is selected from a group consisting of: plastic scintillators; organic scintillators; inorganic scintillators; gas detectors; and semiconductor detectors.

13. The spatially-aware radiation probe method of claim 11 wherein said RD comprises a background radiation detector/sensor (BRD) and a measurement radiation detector/sensor (MRD).

14. The spatially-aware radiation probe method of claim 11 wherein said SAS comprises a sensor selected from a group consisting of: distance measurement sensor; accelerometer sensor; and axial orientation sensor.

15. The spatially-aware radiation probe method of claim 11 wherein said measurement coordination commands (MCC) generated by said computing device (CD) are determined based on a minimum detectable activity (MDA) algorithm applied to said detected radiation.

16. The spatially-aware radiation probe method of claim 11 wherein said measurement coordination commands (MCC) generated by said computing device (CD) comprise instructions selected from a group consisting of: visually prompting an operator to spatially position said RD; audibly prompting an operator to spatially position said RD using audible tones; audibly prompting an operator to spatially position said RD using voice commands; and generating operator instructions on a graphical user interface (GUI).

17. The spatially-aware radiation probe method of claim 11 wherein said measurement coordination commands (MCC) generated by said computing device (CD) are determined by a state machine configured to operate under control of said CD and wherein state transitions within said state machine are controlled by inputs from said RD and said SAS.

18. The spatially-aware radiation probe method of claim 11 wherein said measurement coordination commands (MCC) generated by said computing device (CD) comprise customized radiation measurement profiles retrieved from a remote operator instruction database by said CD via a computer network.

19. The spatially-aware radiation probe method of claim 11 wherein said CD is selected from a group consisting of: handheld computer; tablet computer; smartphone; cell phone; and laptop computer.

20. The spatially-aware radiation probe method of claim 11 wherein said RD, said SAS, and said CD are integrated into a portable handheld radiation probe.

21. A tangible non-transitory computer usable medium having computer-readable program code means embodied therein for causing a computing device to execute a spatially-aware radiation probe method, said method comprising:

(1) measuring radiation of a monitored subject/object using a radiation detector (RD) to generate measured radiation parameters;

(2) detecting the spatial context of said radiation detector and/or monitored subject/object using a spatially-aware sensor (SAS) to generate spatial context parameters;

(3) transmitting said measured radiation and spatial context parameters to a computing device (CD) for analysis;

(4) analyzing said measured radiation parameters using said spatial context parameters;

(5) based on said analysis, determining if corrective operator action is required, and if not, proceeding to step (8);

(6) retrieving, by said CD, operator coordination instructions from an operator measurement coordination database based on said corrective operator action;

(7) issuing operator measurement coordination commands (MCC) by said CD to supervise spatial manipulation of said radiation detector by an operator based on said operator coordination instructions retrieved from said operator coordination database and proceeding to step (1);

(8) modifying/correcting said measured radiation parameters using said spatial context parameters; and (9) logging said modified/corrected radiation measurement parameters to a computer database controlled by said computing device.

22. The computer usable medium of claim 21 wherein said RD is selected from a group consisting of: plastic scintillators; organic scintillators; inorganic scintillators; gas detectors; and semiconductor detectors.

23. The computer usable medium of claim 21 wherein said RD comprises a background radiation detector/sensor (BRD) and a measurement radiation detector/sensor (MRD).

24. The computer usable medium of claim 21 wherein said SAS comprises a sensor selected from a group consisting of: distance measurement sensor; accelerometer sensor; and axial orientation sensor.

25. The computer usable medium of claim 22 wherein said measurement coordination commands (MCC) generated by said computing device (CD) are determined based on a minimum detectable activity (MDA) algorithm applied to said detected radiation.

26. The computer usable medium of claim 21 wherein said measurement coordination commands (MCC) generated by said computing device (CD) comprise instructions selected from a group consisting of: visually prompting an operator to spatially position said RD; audibly prompting an operator to spatially position said RD using audible tones; audibly prompting an operator to spatially position said RD using voice commands; and generating operator instructions on a graphical user interface (GUI).

27. The computer usable medium of claim 21 wherein said measurement coordination commands (MCC) generated by said computing device (CD) are determined by a state machine configured to operate under control of said CD and wherein state transitions within said state machine are controlled by inputs from said RD and said SAS.

28. The computer usable medium of claim 21 wherein said measurement coordination commands (MCC) generated by said computing device (CD) comprise customized radiation measurement profiles retrieved from a remote operator instruction database by said CD via a computer network.

29. The computer usable medium of claim 21 wherein said CD is selected from a group consisting of: handheld computer; tablet computer; smartphone; cell phone; and laptop computer.

30. The computer usable medium of claim 21 wherein said RD, said SAS, and said CD are integrated into a portable handheld radiation probe.

31. A spatially-aware radiation probe system comprising:
(a) radiation detector (RD);
(b) spatially-aware sensor (SAS); and
(c) computing device (CD);

wherein
said RD is configured to detect radiation;
said RD is physically coupled to said SAS;
said SAS is configured to detect a spatial parameter associated with the spatial context of said RD;
said RD is electrically coupled to said CD and configured to transmit information on said detected radiation to said CD;
said SAS is electrically coupled to said CD and configured to transmit said spatial parameter to said CD;
said CD is configured to generate measurement coordination commands (MCC) that supervise the measurement of said detected radiation based on said spatial parameter received from said SAS; and
said CD is configured to execute instructions in a state machine comprising:
(1) STANDBY mode in which status alarms are deactivated;
(2) FRISKING mode in which said CD collects background radiation information from said RD; and
(3) COUNTING mode in which said CD collects static radiation measurements from said RD and determines a CONTAMINATION/NO CONTAMINATION status based on said static radiation measurements.

32. The spatially-aware radiation probe system of claim 31 wherein said RD is selected from a group consisting of: plastic scintillators; organic scintillators; inorganic scintillators; gas detectors; and semiconductor detectors.

33. The spatially-aware radiation probe system of claim 31 wherein said RD comprises a background radiation detector/sensor (BRD) and a measurement radiation detector/sensor (MRD).

34. The spatially-aware radiation probe system of claim 31 wherein said SAS comprises a sensor selected from a group consisting of: distance measurement sensor; accelerometer sensor; and axial orientation sensor.

35. The spatially-aware radiation probe system of claim 31 wherein said measurement coordination commands (MCC) generated by said computing device (CD) are determined based on a minimum detectable activity (MDA) algorithm applied to said detected radiation.

36. The spatially-aware radiation probe system of claim 31 wherein said measurement coordination commands (MCC) generated by said computing device (CD) comprise instructions selected from a group consisting of: visually prompting an operator to spatially position said RD; audibly prompting an operator to spatially position said RD using audible tones; audibly prompting an operator to spatially position said RD using voice commands; and generating operator instructions on a graphical user interface (GUI).

37. The spatially-aware radiation probe system of claim 31 wherein said measurement coordination commands (MCC) generated by said computing device (CD) are determined by a state machine configured to operate under control of said CD and wherein state transitions within said state machine are controlled by inputs from said RD and said SAS.

38. The spatially-aware radiation probe system of claim 31 wherein said measurement coordination commands (MCC) generated by said computing device (CD) comprise customized radiation measurement profiles retrieved from a remote operator instruction database by said CD via a computer network.

39. The spatially-aware radiation probe system of claim 31 wherein said CD is selected from a group consisting of: handheld computer; tablet computer; smartphone; cell phone; and laptop computer.

40. The spatially-aware radiation probe system of claim 31 wherein said RD, said SAS, and said CD are integrated into a portable handheld radiation probe.

41. A spatially-aware radiation probe method comprising:
(1) entering a STANDBY mode in a computing device (CD) in which all radiation alarms are deactivated;
(2) determining with said CD if a spatially-aware sensor (SAS) is active/proximal to a monitored subject/object, and if not, proceeding to step (1);
(3) entering a FRISKING (dynamic) mode in said CD to detect background radiation using a radiation detector (RD);
(4) determining with said CD if said background radiation is at an acceptable level, and if not, proceeding to said step (3);
(5) determining with said CD if an alarm has been triggered, and if not, proceeding to said step (3);
(6) issuing operator measurement coordination commands (MCC) by said CD to supervise spatial manipulation of said RD prompting a user to inspect a suspect area on said monitored subject/object using said RD by positioning said RD proximal to said suspect area;
(7) entering a COUNTING mode in said CD;
(8) measuring radiation using said CD from said suspect area of said monitored subject/object using said RD to generate measured radiation value until an accuracy threshold is reached;
(9) determining if said measured radiation value is greater than a threshold for contamination, and if not, proceeding to step (11);
(10) presenting a CONTAMINATION message with said CD to said user and proceeding to step (12);
(11) presenting a NO CONTAMINATION message with said CD to said user; and
(12) terminating said FRISKING/COUNTING modes in said CD and proceeding to said step (1).

42. The spatially-aware radiation probe method of claim 41 wherein said RD is selected from a group consisting of: plastic scintillators; organic scintillators; inorganic scintillators; gas detectors; and semiconductor detectors.

43. The spatially-aware radiation probe method of claim 41 wherein said RD comprises a background radiation detector/sensor (BRD) and a measurement radiation detector/sensor (MRD).

44. The spatially-aware radiation probe method of claim 41 wherein said SAS comprises a sensor selected from a group consisting of: distance measurement sensor; accelerometer sensor; and axial orientation sensor.

45. The spatially-aware radiation probe method of claim 41 wherein said measurement coordination commands (MCC) generated by said computing device (CD) are determined based on a minimum detectable activity (MDA) algorithm applied to said detected radiation.

46. The spatially-aware radiation probe method of claim 41 wherein said measurement coordination commands (MCC) generated by said computing device (CD) comprise instructions selected from a group consisting of: visually prompting an operator to spatially position said RD; audibly prompting an operator to spatially position said RD using audible tones; audibly prompting an operator to spatially position said RD using voice commands; and generating operator instructions on a graphical user interface (GUI).

47. The spatially-aware radiation probe method of claim 41 wherein said measurement coordination commands (MCC) generated by said computing device (CD) are determined by a state machine configured to operate under control of said CD and wherein state transitions within said state machine are controlled by inputs from said RD and said SAS.

48. The spatially-aware radiation probe method of claim 41 wherein said measurement coordination commands (MCC) generated by said computing device (CD) comprise customized radiation measurement profiles retrieved from a remote operator instruction database by said CD via a computer network.

49. The spatially-aware radiation probe method of claim 41 wherein said CD is selected from a group consisting of: handheld computer; tablet computer; smartphone; cell phone; and laptop computer.

50. The spatially-aware radiation probe method of claim 41 wherein said RD, said SAS, and said CD are integrated into a portable handheld radiation probe.

51. A tangible non-transitory computer usable medium having computer-readable program code means embodied therein for causing a computing device to execute a spatially-aware radiation probe method, said method comprising:
  (1) entering a STANDBY mode in a computing device (CD) in which all radiation alarms are deactivated;
  (2) determining with said CD if a spatially-aware sensor (SAS) is active/proximal to a monitored subject/object, and if not, proceeding to step (1);
  (3) entering a FRISKING (dynamic) mode in said CD to detect background radiation using a radiation detector (RD);
  (4) determining with said CD if said background radiation is at an acceptable level, and if not, proceeding to said step (3);
  (5) determining with said CD if an alarm has been triggered, and if not, proceeding to said step (3);
  (6) issuing operator measurement coordination commands (MCC) by said CD to supervise spatial manipulation of said RD prompting a user to inspect a suspect area on said monitored subject/object using said RD by positioning said RD proximal to said suspect area;
  (7) entering a COUNTING mode in said CD;
  (8) measuring radiation using said CD from said suspect area of said monitored subject/object using said RD to generate measured radiation value until an accuracy threshold is reached;
  (9) determining if said measured radiation value is greater than a threshold for contamination, and if not, proceeding to step (11);
  (10) presenting a CONTAMINATION message with said CD to said user and proceeding to step (12);
  (11) presenting a NO CONTAMINATION message with said CD to said user; and
  (12) terminating said FRISKING/COUNTING modes in said CD and proceeding to said step (1).

52. The computer usable medium of claim 51 wherein said RD is selected from a group consisting of: plastic scintillators; organic scintillators; inorganic scintillators; gas detectors; and semiconductor detectors.

53. The computer usable medium of claim 51 wherein said RD comprises a background radiation detector/sensor (BRD) and a measurement radiation detector/sensor (MRD).

54. The computer usable medium of claim 51 wherein said SAS comprises a sensor selected from a group consisting of: distance measurement sensor; accelerometer sensor; and axial orientation sensor.

55. The computer usable medium of claim 51 wherein said measurement coordination commands (MCC) generated by said computing device (CD) are determined based on a minimum detectable activity (MDA) algorithm applied to said detected radiation.

56. The computer usable medium of claim 51 wherein said measurement coordination commands (MCC) generated by said computing device (CD) comprise instructions selected from a group consisting of: visually prompting an operator to spatially position said RD; audibly prompting an operator to spatially position said RD using audible tones; audibly prompting an operator to spatially position said RD using voice commands; and generating operator instructions on a graphical user interface (GUI).

57. The computer usable medium of claim 51 wherein said measurement coordination commands (MCC) generated by said computing device (CD) are determined by a state machine configured to operate under control of said CD and wherein state transitions within said state machine are controlled by inputs from said RD and said SAS.

58. The computer usable medium of claim 51 wherein said measurement coordination commands (MCC) generated by said computing device (CD) comprise customized radiation measurement profiles retrieved from a remote operator instruction database by said CD via a computer network.

59. The computer usable medium of claim 51 wherein said CD is selected from a group consisting of: handheld computer; tablet computer; smartphone; cell phone; and laptop computer.

60. The computer usable medium of claim 51 wherein said RD, said SAS, and said CD are integrated into a portable handheld radiation probe.

* * * * *